June 21, 1927.

G. O. DEGENER 1,633,242

ADDING ATTACHMENT FOR TYPEWRITING MACHINES

Filed Sept. 10, 1924     12 Sheets-Sheet 1

June 21, 1927.

G. O. DEGENER 1,633,242

ADDING ATTACHMENT FOR TYPEWRITING MACHINES

Filed Sept. 10, 1924

Inventor
G. O. Degener
by his Attorneys
Baldwin Wight

June 21, 1927.

G. O. DEGENER 1,633,242

ADDING ATTACHMENT FOR TYPEWRITING MACHINES

Filed Sept. 10, 1924   12 Sheets-Sheet 4

Inventor
G. O. Degener
by his Attorneys

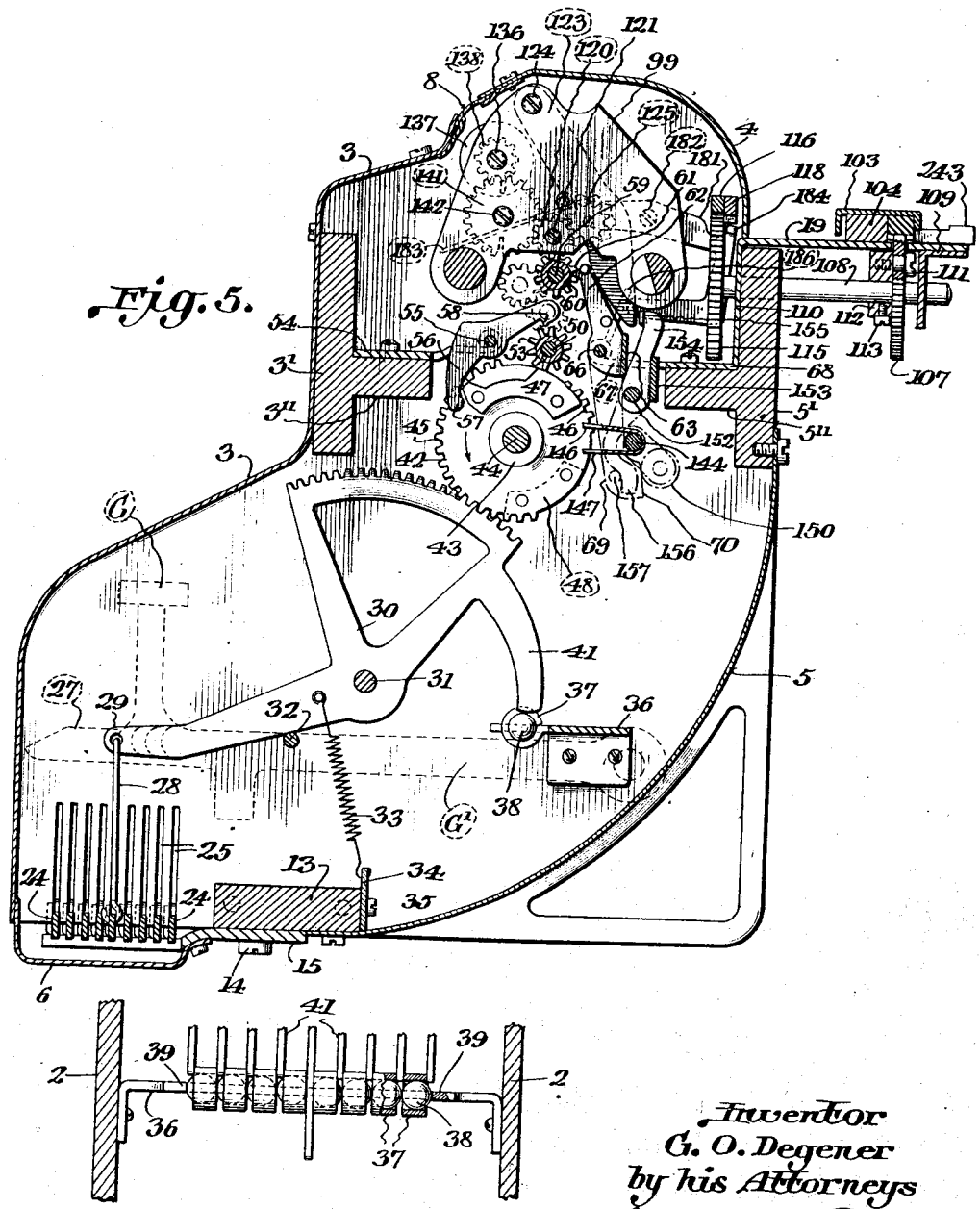

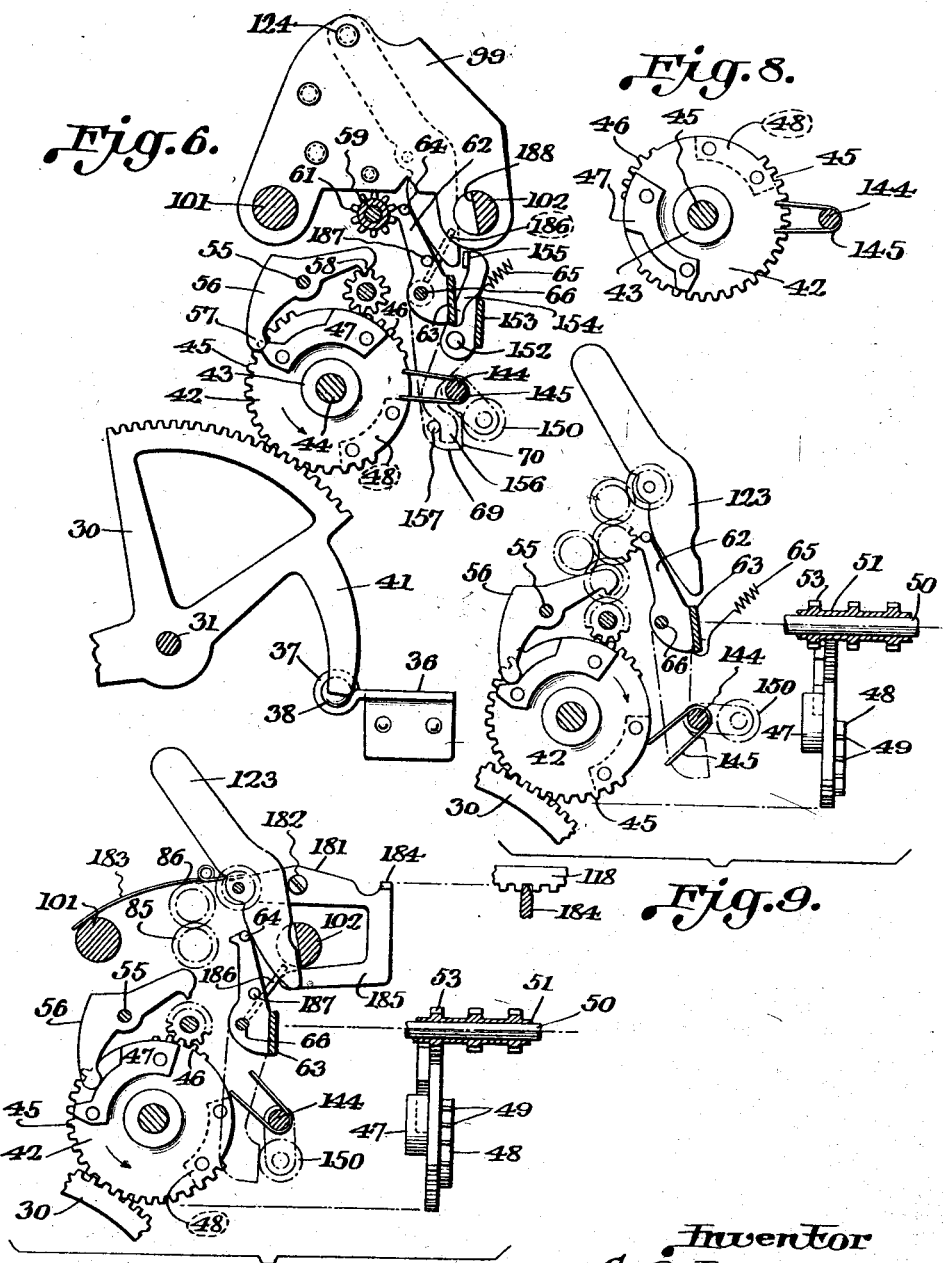

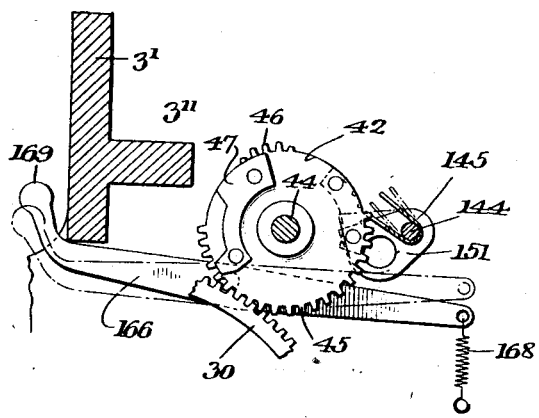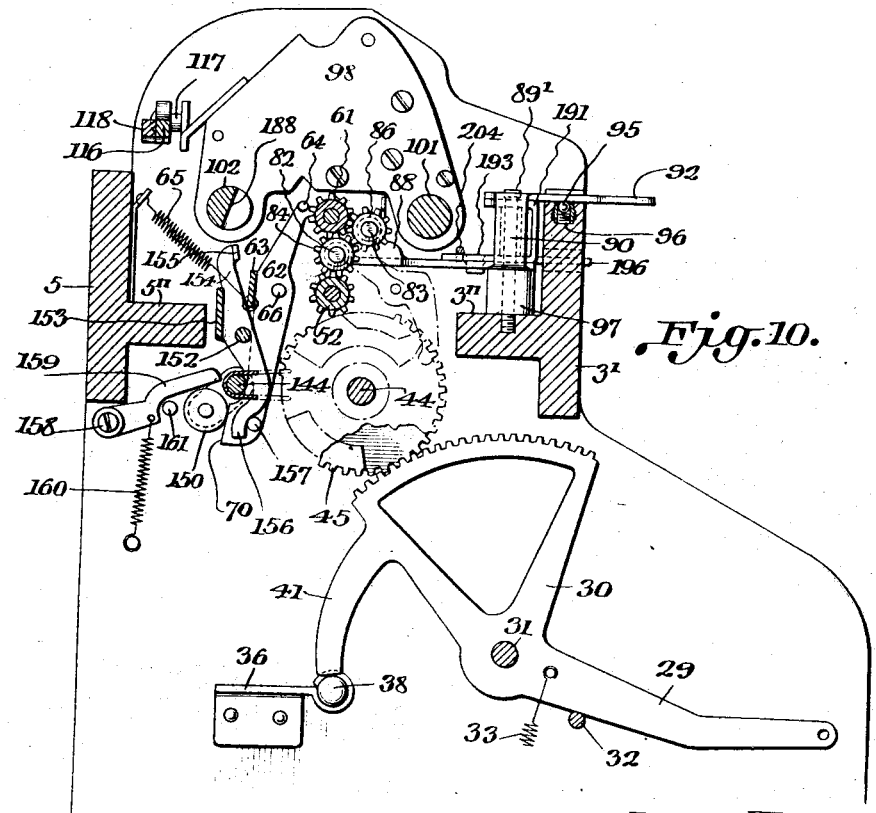

June 21, 1927.
G. O. DEGENER
1,633,242
ADDING ATTACHMENT FOR TYPEWRITING MACHINES
Filed Sept. 10, 1924   12 Sheets-Sheet 8
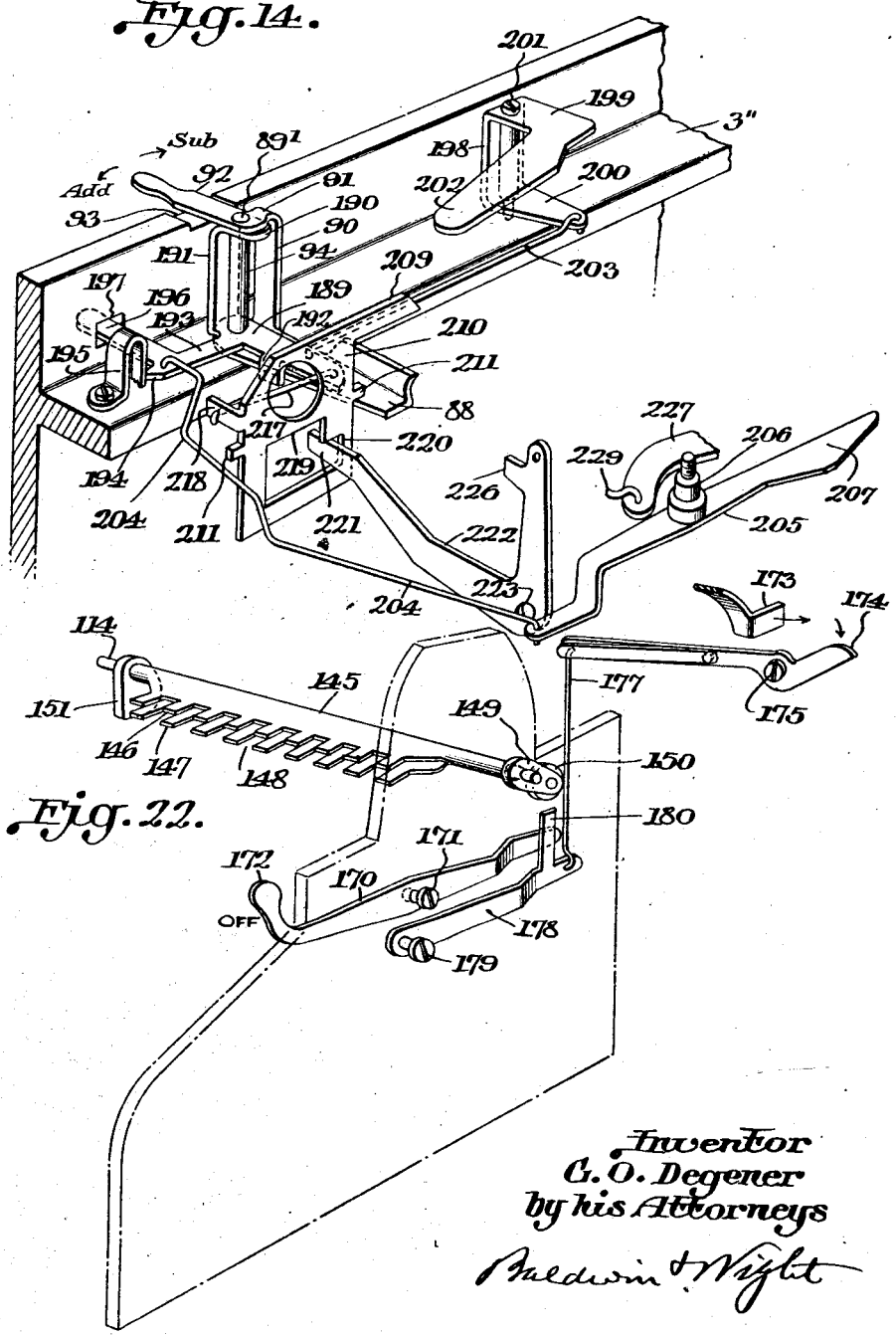

June 21, 1927.
G. O. DEGENER
1,633,242
ADDING ATTACHMENT FOR TYPEWRITING MACHINES
Filed Sept. 10, 1924   12 Sheets-Sheet 9
Fig. 15.
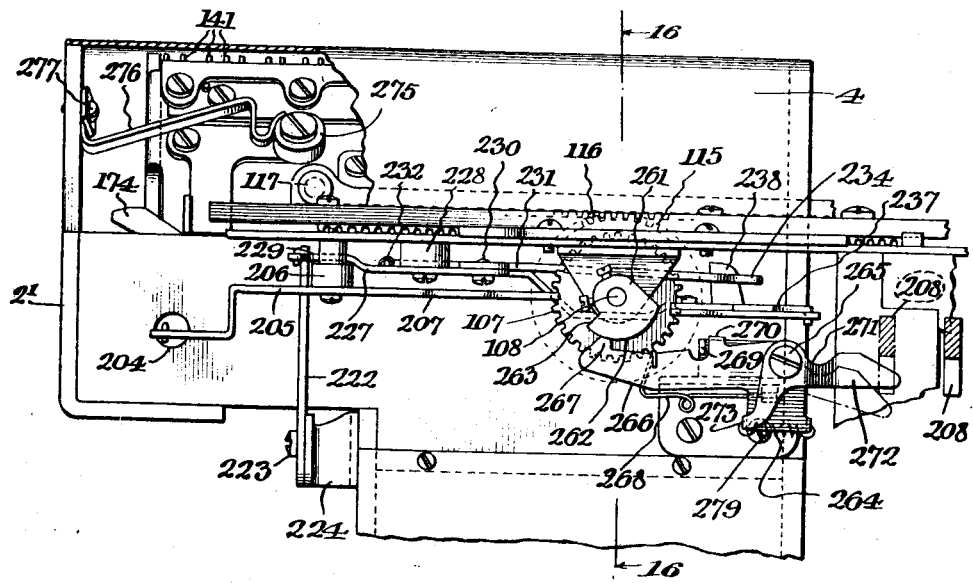
Fig. 16.
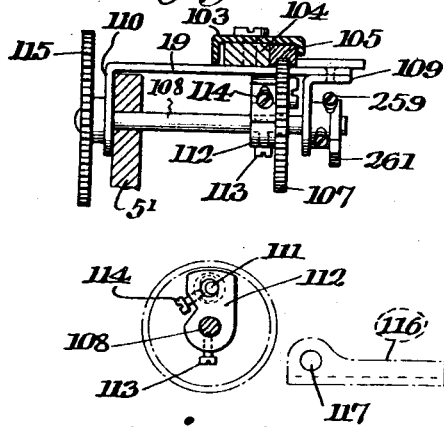
Fig. 17.
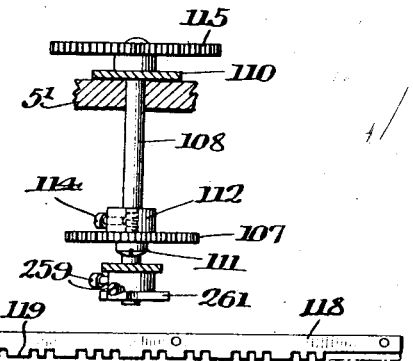
Fig. 18.
Fig. 26.
Inventor
G. O. Degener
by his Attorneys
Baldwin Wight

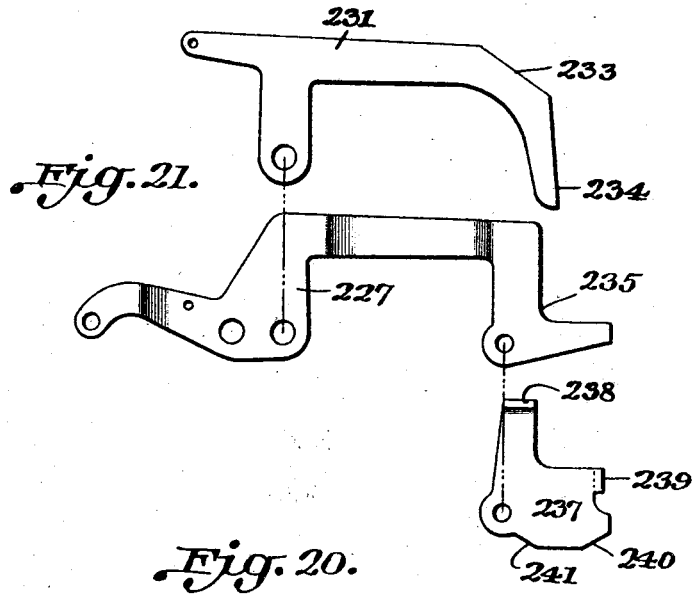
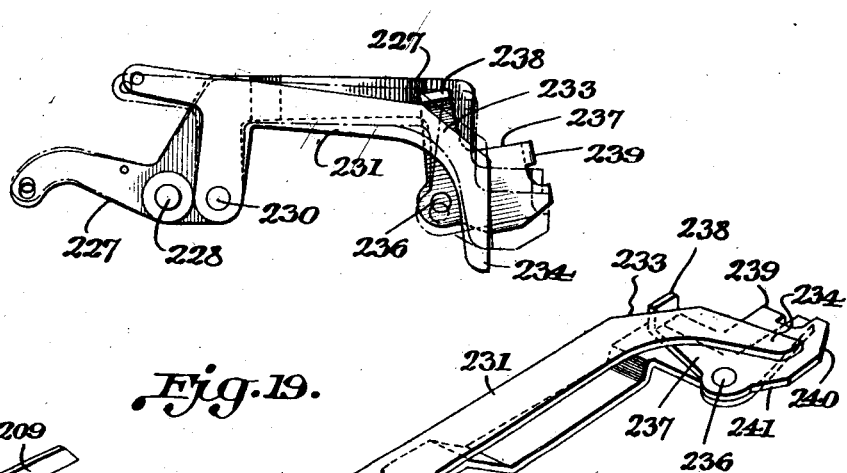
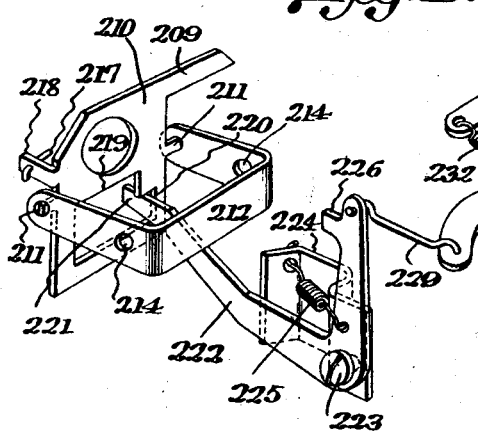

June 21, 1927.

G. O. DEGENER 1,633,242

ADDING ATTACHMENT FOR TYPEWRITING MACHINES

Filed Sept. 10, 1924  12 Sheets-Sheet 11

Inventor
G. O. Degener
by his Attorneys

June 21, 1927.
G. O. DEGENER
1,633,242
ADDING ATTACHMENT FOR TYPEWRITING MACHINES
Filed Sept. 10, 1924  12 Sheets-Sheet 12
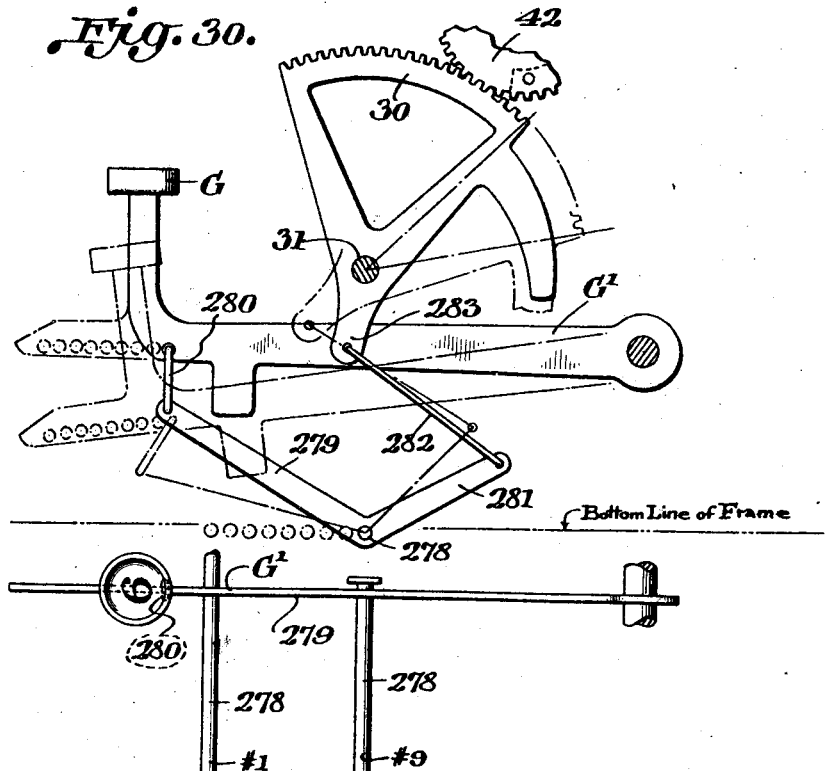
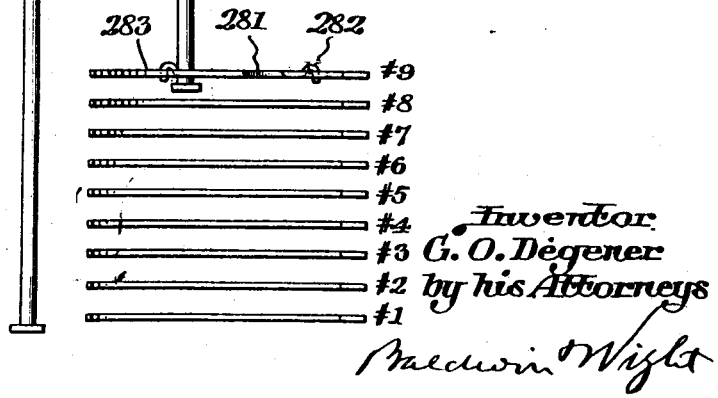

Patented June 21, 1927.

1,633,242

UNITED STATES PATENT OFFICE.

GUSTAVE O. DEGENER, OF HARTFORD, CONNECTICUT, ASSIGNOR TO ROYAL TYPEWRITER COMPANY, INC., OF NEW YORK, N. Y., A CORPORATION OF NEW YORK.

ADDING ATTACHMENT FOR TYPEWRITING MACHINES.

Application filed September 10, 1924. Serial No. 736,896.

My invention relates primarily to an attachment for typewriting machines which may be placed in position thereon and removed therefrom quickly and easily without any modification of the typewriting machine itself. To remove the attachment it is only necessary to unhook the operating levers from the numeral key levers and remove three screws. All parts can thereupon be detached from the frame of the typewriting machine as a unit with the exception of a small member carried by the typewriting machine carriage which in no way affects the operation of the typewriting machine. This may also be readily removed, but this is unnecessary.

The attachment is located at one side of the machine where it does not in any way interfere with the usual operations of the machine and does not obstruct the line of sight to the paper as is common in many cases. Moreover, it is automatically connected to the carriage of the typewriting machine only when the latter is in the computing zone, and by the movement of a small lever carried by the carriage it may be prevented from such automatic connection so that the typewriting machine may be used to write in the usual manner without computing.

Furthermore, when thus entirely disconnected, or when the carriage is not in the computing zones, the adding mechanism does not in any way obstruct the movement of the carriage and only very slightly increases the force necessary to operate the numeral keys.

While illustrated as applied to the well known Royal standard machine, it is to be understood that the attachment may be applied to any of the standard commercial machines, only minor changes in the connections being required and none in the structure of the adding mechanism itself.

Another main object of the invention has been the production of an attachment which will be comparatively simple to construct and less costly to manufacture than prior devices of this character. This simplicity has been attained in part by various novel features which will appear from the detailed description, and also because it is intended to do a definite class of work, and many of the complexities which have been thought necessary in prior constructions have been avoided.

This computing attachment is designed primarily for billing purposes and can be employed wherever this class of work is to be performed. In making out such bills or statements, the various items are written, each with date, name of article, etc., and then the carriage is moved, preferably by tabulating mechanism to the first computing zone, where the amounts are written one under the other. At this time the various amounts are set up in the column totalizer, the figures of which at any time, show the sum of the amounts written.

When a bill is finished and it is desired to write the total, the carriage is moved into the second computing zone, a lever is moved to subtract position, and the operator writes the amount appearing in the column totalizer. This will clear the column totalizer, while at the same time the amount is set up in the grand totalizer. Succeeding bills are written in the same manner without further attention on the part of the operator, since the return of the carriage to position for writing items in a new bill automatically returns the lever to add position.

It is common in work of this character to give to the operator a large number of the tickets which have been made out in the departments of the store for charge to various customers on the proper bills. The bookkeeper or other operator will list all of the tickets on any desired form of listing machine, thus obtaining a grand total. Obviously, when the billing operator has completed the work, the total appearing on the grand totalizer should agree with this total obtained from the listing machine.

One of the objections to computing machines previously employed for performing this class of work has been that the operator may make an error in copying the total of some bill from the column totalizer register. If this is not noted, the total of the bill just written will be too small by the amount not copied and the register will not be cleared. However, in all previous constructions the succeeding bill could be written without noticing this fact, and of course this bill would be as much greater than the correct amount as the preceding bill was too small. However, the amount showing in the grand totalizer would be correct and would agree with the total obtained from the listing machine.

One object of the invention is to prevent any such error. Means are provided whereby if the total is not correctly copied from the register of the column totalizer, it will be impossible to return the carriage to position for writing the next item on the bill. The operator will then know that the number has been improperly copied and will correct the same. As soon as this is done and the column register completely cleared so that all units stand at zero, the carriage can be returned to its right hand position for beginning a new bill. All chance of error from this source is therefore removed.

Another important feature of the invention is the provision of a construction wherein all computations, whether debits or credits, are entered in only one register, after which this is cleared as the total is transferred to the grand totalizer. There are never two registers adding at the same time. The advantage of this fact lies in the ability to make out a new bill which may correct errors due to striking wrong numeral keys on the typewriter by merely clearing the column totalizer of what has been written, and then rewriting the bill. This in no way affects the grand totalizer, since this is not operated while the individual items of the bill are being written.

Another common source of error in operations of this character arises from the fact that it is occasionally necessary to write a credit item which should be subtracted from the sum of the previous debit items already entered in the column totalizer. It is necessary for the operator to shift the add and subtract lever to the subtracting position before entering this credit item. In the absence of any provision to prevent the contrary the operator might return the carriage and write the next item, which is a debit, without moving the lever back to add position. I have provided means whereby whenever a credit item is written and subtracted from the column totalizer, it will be impossible to return the carriage to the position for writing the next line unless the lever is moved back to add position. This prevents any errors of the character above mentioned.

A still further source of error arises from the fact that when the operator desires to write the total of the bill, clearing the column totalizer and entering the total in the grand totalizer, it is also necessary to move the lever to subtract position. Occasionally the writer might forget to do this. If the lever remains in the add position the sum written which is copied from the column totalizer would be subtracted from the grand totalizer. The register of the grand totalizer would therefore be inaccurate and the register of the column totalizer instead of being clear would show exactly twice the proper sum. I have provided means whereby if this error is made it is impossible for the operator to return the carriage to position for writing a new line. Attention is thus called to the error. To correct the same it is only necessary to position the carriage in the zone of the grand totalizer, set the lever properly to subtract, and write the proper total twice, the numerals in each case being written immediately on top of those previously written and therefore it is not necessary to write a new bill. The column totalizer is then cleared and the proper number appears in the grand totalizer.

Another object of my invention is the provision of a full stroke mechanism which is intimately associated with a computing mechanism and has no effect upon the typewriter numeral keys except when the carriage is in the computing zones and is connected to the computing mechanism.

Another object of the invention is the provision of very simple means for preventing the depression of more than one numeral key at a time which means is associated with the sectors which govern the movement of the register wheels. This enables a very small compact mechanism for obtaining this result, since instead of being necessary to extend the same for the full width of the typewriter key board it is only necessary to have it extend the relatively short distance taken up by the nine sectors.

A further object of the invention is to provide extremely simple and efficient means for instantly connecting or disconnecting the typewriter carriage and the computing register. This means embodies a finger piece on the typewriter carriage so positioned as not to interfere with any of the usual typewriter mechanism but which can be operated instantly to move a pick-up dog to a position where it will connect the carriage to the computing mechanism when in the computing zone or to a second position where it will be free entirely from any connection with the computing mechanism regardless of the position of the carriage.

Another object of the invention is the provision of means whereby the movement of the register to its extreme right hand position will automatically disconnect the computing mechanism from the numeral keys of the typewriter.

Another object of the invention is the provision of means whereby the computing mechanism may be momentarily disconnected from the numeral keys of the typewriter whenever it is desired to rewrite a figure in the computing zone which has already been entered in the register.

Since the device is provided with full stroke mechanism which prevents the return of any actuated numeral type bar until it has moved to printing position it necessarily follows that any type bar whose key lever was erroneously depressed would be obliged to move to printing position even if the operator had struck the wrong key without force enough to print from the same. My invention provides means whereby any type bar thus wrongly moved part-way to printing position may be permitted to return to normal without having effected any operation of the computing mechanism.

Numerous other objects of the invention will be apparent from the following detailed description and the appended claims.

In the drawings:

Figure 5 is a vertical section on the line 5—5 of Figure 3 with the parts in normal position.

Figure 6 is a similar section of a portion of the computing mechanism with the parts shown in the position which they occupy at the initial depression of a key.

Figure 7 is a similar view showing the position of the parts with the key about half depressed.

Figure 8 is a detail of the cam gear in the position which it occupies when the key is fully depressed.

Figure 9 is a sectional view similar to Figures 6 and 7 but showing the position of the parts just after the beginning of the return movement of the key.

Figure 10 is a section similar to Figure 5 but viewed from the opposite side of the machine.

Figure 11 is a section showing the relation of the cancel lever to the cam gear and other parts.

Figure 14 is a perspective view of certain error check and disconnecting mechanism.

Figure 15 is a rear view of the attachment with a portion of the cover broken away.

Figure 16 is a section on the line 16—16 of Figure 15, showing the means by which the register is moved by the typewriting machine carriage.

Figure 17 is a top plan view of the same.

Figure 18 is a detail view of an adjustment device between the carriage and the register.

Figure 19 is a perspective view of certain error check mechanism.

Figure 20 is a top plan view of a part of the same.

Figure 21 is a disassembled view of the parts shown in Figure 20.

Figure 22 is a perspective view of the key lock rocker and the manual and automatic operating means therefor.

Figure 26 is an enlarged elevation of the rack to prevent printing in the punctuation spaces.

Figure 27 is a perspective view with parts in section showing the means for preventing simultaneous depression of two numeral keys.

Figure 28 is a side elevation of the pick up dog carried by the carriage.

Figure 29 is a top plan view of the same.

Figure 30 is a side elevation with parts in section showing a modification of the means for connecting the key levers to the sectors.

Figure 31 is a top plan view of the same.

The invention has been illustrated in connection with the Royal standard machine although it is capable of application to any of the various commercial typewriters. The typewriting machine itself has been illustrated only conventionally since its precise structure forms no part of the invention. There is shown a machine frame A, carriage B supporting a platen C, type-bar mechanism D, ribbon mechanism E and a keyboard F provided with numeral keys G having levers G'. All of these parts may be of any suitable or desired construction.

Figure 2:
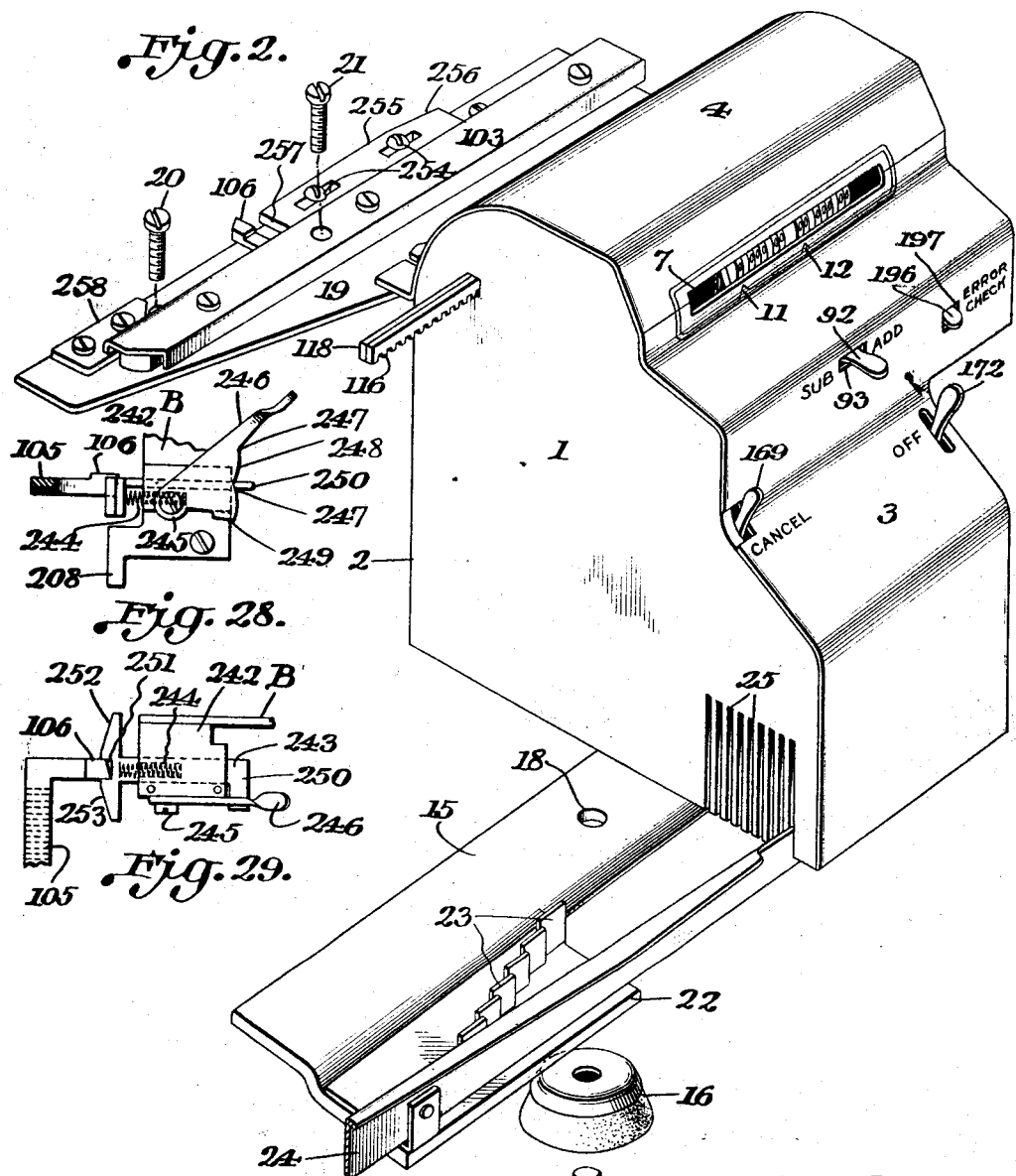
Figure 2 is a perspective view of the attachment removed from the machine.

The attachment itself (Figs. 2 and 5) comprises a frame 1 consisting of side plates 2, a transverse front plate 3' having a shelf 3'' and a similar transverse rear plate 5' having a shelf 5''. The upper portion is wider than the lower and has a side plate 2'. The working parts are enclosed by a front sheet metal plate 3, the top plate 4, the rear and bottom plate 5 and a bottom plate 6 for the front thereof so that all of the working parts of the computing mechanism are enclosed and kept free from dust or interference. The top and front plates 3 and 4 have at their juncture a narrow opening 7 through which the registers 9 and 10 may be read. This opening may be covered by a celluloid or similar strip 8. Indices 11 and 12 denote the positions of the register.

The transverse plate 13 is carried by the bottom of the two side plates and attached thereto by screws 14 is a plate 15 which extends about half way across the typewriting machine beneath the key board thereof. One of the usual front feet 16 of the typewriting machine is normally held in position by a screw 17 and this screw passes through an opening 18 in the plate 15. In this manner the attachment is firmly secured to the frame of the typewriting machine. At the top and rear thereof the casing 1 is provided with a plate 19 which is attached to the frame of the machine by two screws 20 and 21. If it is desired to remove the attachment from the typewriting machine it is only necessary to take out the three screws 17, 20 and 21 and the attachment is entirely free so far as its connection with the frame of the typewriting machine is concerned.

The plate 15 has a broad extension 22 provided with a series of up-turned ears 23 in which are mounted levers 24 that extend transversely of the key board of the machine and work in slots 25 in one of the side plates 2 of the adding attachment casing. One end of each lever 24 is connected by a link 26 to one of the numeral key levers 27. The other end of each lever 24 is connected by a link 28 to an arm 29 which extends forwardly from a sector 30 which is mounted on a shaft 31 supported in the side plates of the casing. There are nine of the levers 24 corresponding to the nine numeral keys of the typewriter. Each sector 30 is normally held in position against a stop 32 by means of a spring 33 one end of which is fastened to the sector and the other end of which is hooked into a plate 34 connected by screws 35 to the transverse bar 13.

Supported by the side walls of the casing is a plate 36 which has its front edge divided into a series of fingers by slots approximately the width of the thickness of the sectors. These fingers are turned into substantially cylindrical shape and supported therein is a series of balls 38. At each side of the two outside fingers 37 is a projecting stop 39 integral with the plate 36. These stops are located at such position that the balls are allowed a very slight play just sufficient to allow a projection 41 from each sector to move downward through one of the slots between two fingers 37. Whenever one of the members 41 is thus moved the balls are displaced endwise sufficiently to permit its passage but the lost motion is not sufficient to allow a second member 41 to be moved through its slot until the first member has returned to normal position. This affords means whereby only one of the numeral keys can be displaced at the same time. Since the width of this key locking mechanism is only that of the nine sectors and the balls may be relatively small and light, this mechanism places no particular additional work upon a depression of one of the typewriter keys. Since it is associated with the sectors which are constantly connected to the numeral keys this locking mechanism is always operative regardless of whether the computing mechanism is operating or not.

The gear teeth on each sector 30 are adapted to mesh with one of the series of cam gears 42. Each cam gear has a hub 43 and is mounted to rotate on the shaft 44, the ends of which are supported by the casing. Each cam gear has a series of teeth 45 on one edge thereof adapted to mesh with the teeth on the sector. It also has a series of teeth 46 varying in number according to the denomination of the key lever which operates it. On one face of the cam gear is a cam member 47 while a second cam member 48 is carried on the opposite face of the wheel. The function of these cam members will be explained in detail hereinafter. The shaft 50 is supported above the cam gears and is provided with a sleeve 51 slidable and rotatable thereon, said sleeve having the elongated pinions 52 at one end and a series of unit pinions 53 spaced apart at distances corresponding to the spaces between the cam gears.

A plate 54 fixed to the casing member 3' has one edge divided into fingers which are turned at their ends to form eyes in which is supported a shaft 55 upon which are pivoted a series of unit pinion pawls 56. The tail of each pawl is provided with a cam 57 adapted to cooperate with the cam 47 on the face of the cam gear 42. The other end of the pawl is provided with a detent nose 58 which is normally out of engagement with the teeth of the unit pinion 53 but is adapted to be moved into engagement therewith when the pawl is operated by the cam 47.

Mounted in the casing above the shaft 50 is a shaft 59 provided with a sleeve 60 carrying the two master wheels 61 which are normally engaged by master wheel pawls 62. These pawls carry studs 64 for a purpose hereinafter described, and are normally urged into engagement with the master wheels by a spring 65. The pawls 62 form a part of a frame 63 which is mounted on a shaft 66 carried by ears 67 extending forward from the plate 68 carried by the casing member 5″. This frame 63 is formed with a downwardly extending arm 69 provided with a rearwardly projecting cam end 70 through which the frame is rocked as will be described.

It is to be noted that a sleeve 60 with the gears 61 constitute one integral element which may be defined as a sleeve having on its periphery a plurality of series of equally spaced projections for operating a totalizer, and that there is a relieved portion between the series for clearance purposes. All portions of the device always rotate together and there is no longitudinal change of relative position between the series of projections. Instead of constituting two separate and independent master wheels, this construction really employs a single master element which may operate one or more totalizers depending on the position thereof, but always rotates them in the same direction.

The sleeve 51 which carries the unit pinions 53 normally stands with said pinions out of register with the cam gears 42. Before movement of the numeral keys through the sector 30 and cam gears 42 can be transmitted to the computing mechanism it is necessary for the unit pinions to be moved into register with said cam gears. This is brought about in the following manner:—

Figure 13:
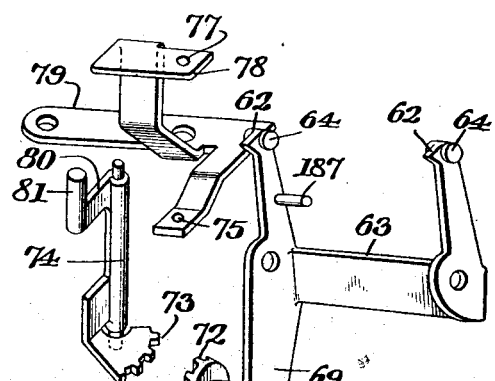
Figure 13 is a disassembled view of the means for shifting the unit pinion sleeve.

The arm 69 has fast thereto a stud 71 carrying a mutilated crown gear 72 (see Fig. 13). The teeth of this crown gear 72 mesh with gear teeth 73 carried by the lower end of a vertical shaft 74 which is stepped at its lower end in an opening 75 of an arm 76 and at its upper end in an opening 77 in an offset arm 78. Both of the arms 76 and 78 are preferably integral with a bracket 79 attached to the rear frame portion 5″. The shaft 74 has an arm 80 near its upper end which is provided with a pin 81 that fits between the elongated pinion 52 and the adjacent unit pinion 53. Whenever the frame 63 is rocked the gear 72 will rotate the gear 73 and turn the shaft 74. By means of the arm 80 and pin 81 this rotary movement of the shaft 74 will slide the sleeve 51 lengthwise on the shaft 50 thereby moving the unit pinions 53 into register with the cam gears 42 so that rotation of said cam gears will be transmitted to the unit pinions.

Figure 25:
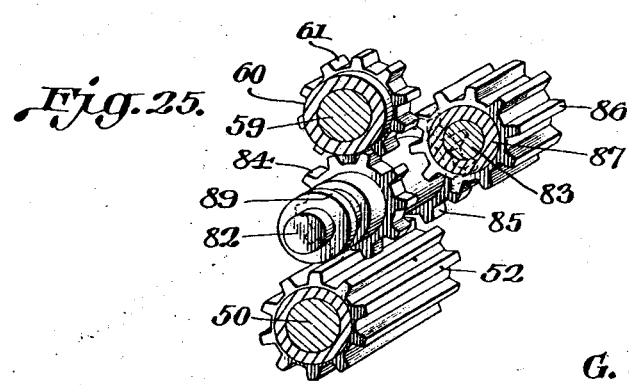
Figure 25 is a perspective view with parts in section of the gearing for shifting from add to subtract and vice versa.

When the unit pinions are rotated it is obviously necessary to transmit the rotation thereof to the master gear. The direction of rotation of the master gear depends upon whether it is desired to add or subtract. This rotation is provided for in the following manner:—Two short studs 82 and 83 (Fig. 10) are mounted in appropriate supports. A sleeve on the stud 82 carries two spaced gears 84 and 85, (Fig. 25) the former of which always meshes with the pinion 52 on the unit pinion sleeve 51. The gear 85 is always in mesh with a gear 86 mounted on a sleeve 87 on the stud 83. Both of the sleeves are moved together by the add and subtract lever 88 which has its rear end adapted to engage a groove 89 in the sleeve 87 carrying the gear 86 and has similar engagement with the sleeve carrying the gears 84 and 85. The lever 88 (Fig. 14) is pivoted on a post 89′ screwed into the shelf of the support 3′. The lever 88 has integral therewith a vertical portion 90 which is provided at its upper end with a bent over ear 91 also pivoted on the post 89′. Preferably integral with the ear 91 is the finger piece 92 which extends outwardly through a slot 93 in the casing. The finger piece 92 (Fig. 10) is held in either of the positions to which it is moved by a ball detent 95 mounted in a depression in the frame member 3′ and pressed outwardly by a spring 96 against depressions in the under side of the finger pieces 92. The lever 88 may rest directly on the shelf 3″ of the support 3′ as shown in Fig. 14 or may be spaced therefrom by a block 97 as shown in Fig. 10. This will depend upon the proportions of the various parts and their relation to each other.

When the parts are in position for subtraction the movement will be transmitted from the pinion 52 to the gear 84 which is at that time in mesh with the master wheel 61. When it is desired to add, the finger piece 92 is moved to the add position and the consequent movement of the lever 88 slides the sleeves carrying the gears 84, 85 and 86 to a position wherein the gear 84 is out of mesh with the gear 61 and the gear 86 is moved into mesh with the gear 61. Rotation of the gear 52 is then transmitted through gears 84, 85 and 86 to the master wheel 61, thereby rotating it in a direction opposite to which it was moved when the parts were in position for subtraction.

The register casing comprises side plates 98 and 99 and a connecting back plate 100. It is mounted to slide on two rods 101 and 102 fast at their inner ends to the side frame of the main casing. Whenever the carriage of the typewriting machine is in the computing zones the register is caused to travel step by step therewith in the following manner:—The top plate 19 (Figs. 5, 16, 17 and 18) has fastened thereto an inverted channel member 103. Blocks 104 within said member and spaced from the side thereof form with one side of the member 103 a guide-way within which slides a rack 105 having at its inner end a right angle detent member 106 (Fig. 1) adapted to be engaged by a pick-up dog on the carriage of the typewriting machine. This rack meshes with a gear 107 mounted to turn with a shaft 108 supported in brackets 109 and 110 extending downwardly from the top plate 19 and the latter being preferably integral therewith. The gear 107 is loose on the shaft 108 but is attached by an eccentric screw 111 to a block 112 which is fastened to the shaft 108 by a set screw 113. This eccentric is locked by a set screw 114. The purpose of this construction is to enable the gear 107 to be properly positioned with relation to the carriage and the shaft 108 when the parts are assembled. The inner end of the shaft 108 carries a gear 115 which meshes with a rack 116 pivotally attached at 117 to the register carriage casing. This rack slides through an opening in the side frame 2 of the casing. Attached to this rack 116 is a rack 118 which has teeth corresponding to the teeth of the rack 116 throughout a portion of its extent but at intervals is provided with wider teeth 119 for a purpose hereinafter described.

The pinion 107 has thirty-two teeth while the pinion 115 has forty teeth. When the usual spacing of the characters on the typewriter of ten to an inch is employed, this enables the register wheels of the computing mechanism to be located eight to an inch. By giving this additional space the members may be made of slightly greater size and certain complexities of construction may be avoided.

The computing mechanism within the register is composed of a series of units each unit comprising an index wheel, a lock gear, a lock gear lever, a dial wheel, and a dial wheel intermediate. As many units are provided as there are denominations which it is desired to write. In the present case the column totalizer register is shown as provided for writing thousands of dollars and the grand totalizer register will write in tens of thousands. The index wheels 120 (Figs. 5, 23 and 24) are carried on the shaft 121 mounted in the side plates 98 and 99 of the register casing. These are brought by movement of the register one by one into position to mesh with one or the other of the master gears 61. Each index wheel has ten teeth, one of which teeth 122 is extended to one side beyond the others. Adjacent the teeth 122 the hub of the index wheel is provided with a depression 122'.

The lock gear levers 123 are pivoted on a shaft 124 extending between the sides of the register casing. They extend downwardly and rearwardly and each lever has pivotally mounted thereon at a point intermediate its ends a lock gear 125. Each lock gear comprises two thin gears 126 and 126' and an interposed detent member 127. Each gear has ten teeth and the central member has ten depressions 129. A spring plate 130 is fastened to the back member 100 of the register frame and is divided into spring fingers 131 each of which has a curved portion 132 adapted to engage one of the depressions 129 in the detent member 127. These springs serve to hold the lock gears against accidental displacement when they are moved out of engagement with the index wheels but also tend to move the lock gears toward their engagement with said index wheels. The movement of these springs is limited in one direction by a stop rod 133. The cover plate 134 is also fast to frame member 100 and extends forwardly and downwardly being provided with slots 135 which guide the lock gear levers and retain them in proper position.

The narrow teeth of any index wheel 120 mesh with the thin gear 126 carried by the lock gear lever while the tooth 122 extends to the left far enough to engage the gear 126' carried by the next lock gear lever at the left. This provides for carrying the tens since when an index wheel is rotated by the depression of the numeral key the lock gear normally engages the same to move out of mesh therewith and if the index wheel is rotated more than a complete revolution the tooth 122 turns the next lock gear to the left the distance of one tooth, this movement being permitted by the depression 122' which permits the passage of a tooth of the locking gear. But this lock gear at the left is in mesh with its index wheel and will transmit this turning movement thereto. Therefore any time that an index wheel is rotated more than a complete revolution the index wheel to the left thereof which records the next higher denomination will be rotated the distance of one tooth.

Mounted on a shaft 136 extending between the sides of the register casing are dial wheels 137, each comprising a disk of suitable material having numerals on its edge and a thin gear 138 affixed to its face. The numerals 139 on the column totalizer dial wheel are preferably black and run in one direction, while the numerals on the grand totalizer dial wheels are preferably red and run in the other direction. Each gear 138 has ten teeth and meshes with one of a series of dial intermediate gears 141 mounted on a shaft 142 which extends between the sides of the register casing. Each gear 141 has twenty teeth separated into two groups by the deep slots 143, the purpose of which will be hereinafter set forth.

Extending between the side frames of the main casing is a shaft 144 (Fig. 5) which carries a member which from one of its main functions may be termed a key lock rocker. It comprises a metal member 145 (Figure 22) bent at its ends to substantially tubular form to fit the shaft 144 and having an upper series of fingers 146 and a lower series of fingers 147 substantially parallel therewith. The fingers of each series are separated by spaces 148. This key lock rocker is mounted immediately in the rear of the cam gears 42 and normally lies in a horizontal plane with the periphery of said gears lying just within the spaces 148. At one end the shaft 144 has an arm 149 extending therefrom and provided with a roller 150 which lies adjacent the end 70 of the arm 69 of the frame 63. At the other end the shaft 144 is provided with a cam arm 151.

Suitably supported on a shaft 152 (Figure 10) is a frame 153 similar in form to the frame 63 and having two upwardly extending arms 154 each provided with an offset ear 155. These ears lie directly behind whichever of the lock gear levers 123 are in position to be operated whenever the key is depressed. The frame 153 has a depending arm 156 lying in position to be engaged by pin 157 carried by the arm 69 of the frame 63. Pivoted to the casing at 158 is a lever 159 drawn by a spring 160 toward a stud 161. This lever is engaged by the roller 150 when the shaft 144 is rocked in one direction and tends to return the key lock rocker to central position. When the key lock rocker is rocked in the opposite direction the spring 65 which returns the frame 63 to normal position acts through said frame to return the key lock rocker to its normal position.

Whenever a key lever is depressed its corresponding sector 30 is actuated thereby rotating the cam gear 42 which is in mesh therewith. At the initial movement of this cam gear the tail 57 of the pawl 56 is engaged by the cam 47 and rocked until the nose 58 of said pawl engages the unit pinion thereby holding the same in alignment. The cam 48 then engages one of the fingers 147 on the key lock rocker and rocks the same upwardly into the position shown in Fig. 7. The finger of the key lock rocker which is in engagement with this cam 48 will thereupon cooperate with the slots or grooves 49 (Fig. 9) in the edge of said cam and will prevent reverse rotation of the cam gear and consequent return of the key lever to normal position until after the key lever has been fully depressed and the cam gear has been rotated to the position shown in Figure 8 wherein the cam 48 moves out of engagement with the key lock rocker and the same is returned to its normal horizontal position.

When the parts reach the position as shown in Figure 7 the roller 150 has been moved against the ends 70 of the arm 69 of the frame 63 and the master wheel pawls 62 have been moved out of engagement with the master wheel. By this same movement of the frame 63 the gear 72 actuates the gears 73 to rotate the shaft 74 and through the finger 81 carried thereby move lengthwise the sleeve 51 carrying the unit pinions. This lengthwise movement of the sleeve brings the unit pinions into position to mesh with the teeth of the actuated cam gear. The rearward movement of the pawl 62 will by means of the pins 64 engage the lock gear lever 123 and move this rearwardly out of its normal position in which the lock gear was in mesh with the index wheel. This unlocks the train of connections and permits the rotation of the unit pinion to be transmitted through the intermediate gears to the master wheel and from the master wheel through the index wheel, and the dial wheel intermediate to the dial wheel and thereby sets up the proper number in the register. Shortly after the unit pinion pawl has engaged the unit pinion the tail thereof drops into a depression in the cam 47 and frees the unit pinion for movement. After the rotation of the unit pinion has been completed and the cam gear is moved substantially into the Figure 8 position the tail of this pawl 56 again rides up on the cam and locks the unit pinions against further movement. At the same time as above stated the cam 48 is moved away from the key lock rocker and the latter has returned to normal position. This completes the cycle of operation on the down stroke of the key.

After the key lock rocker has returned to normal position the cam gear reverses its rotation and moves in the direction indicated in Fig. 9. The key lock rocker is then rocked downward and the fingers 146 will engage the slots 49 in the cam 48 and thereby prevent a second actuation of this cam gear before its return movement is entirely completed. At the same time the spring 65 has returned the frame 63 into normal position so that the pawl 62 again engages the master wheel. In the return movement of the frame 63 the pin 157 carried by the arm 69 thereof has engaged the depending arm 156 of the frame 153 and moved it positively toward the right in Figures 5 and 6. The offset ears 155 then come in contact with the lock gear levers and positively return them to normal position.

Figure 12:
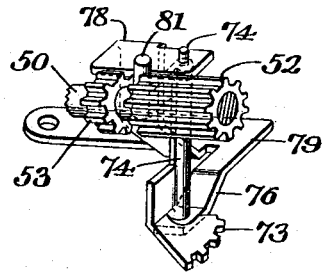
Figure 12 is a detail view showing a portion of the unit pinion sleeve and means for shifting the same.

It is to be noted that when the cam gear 42 reaches the Fig. 8 position and the key lock rocker moves to normal position, the mechanism shown in Figs. 12 and 13 has returned the unit pinion sleeve 51 to normal position so that the unit pinions are no longer in register with the cam gears and the return movement of the latter in no way affects the register.

Figure 3:
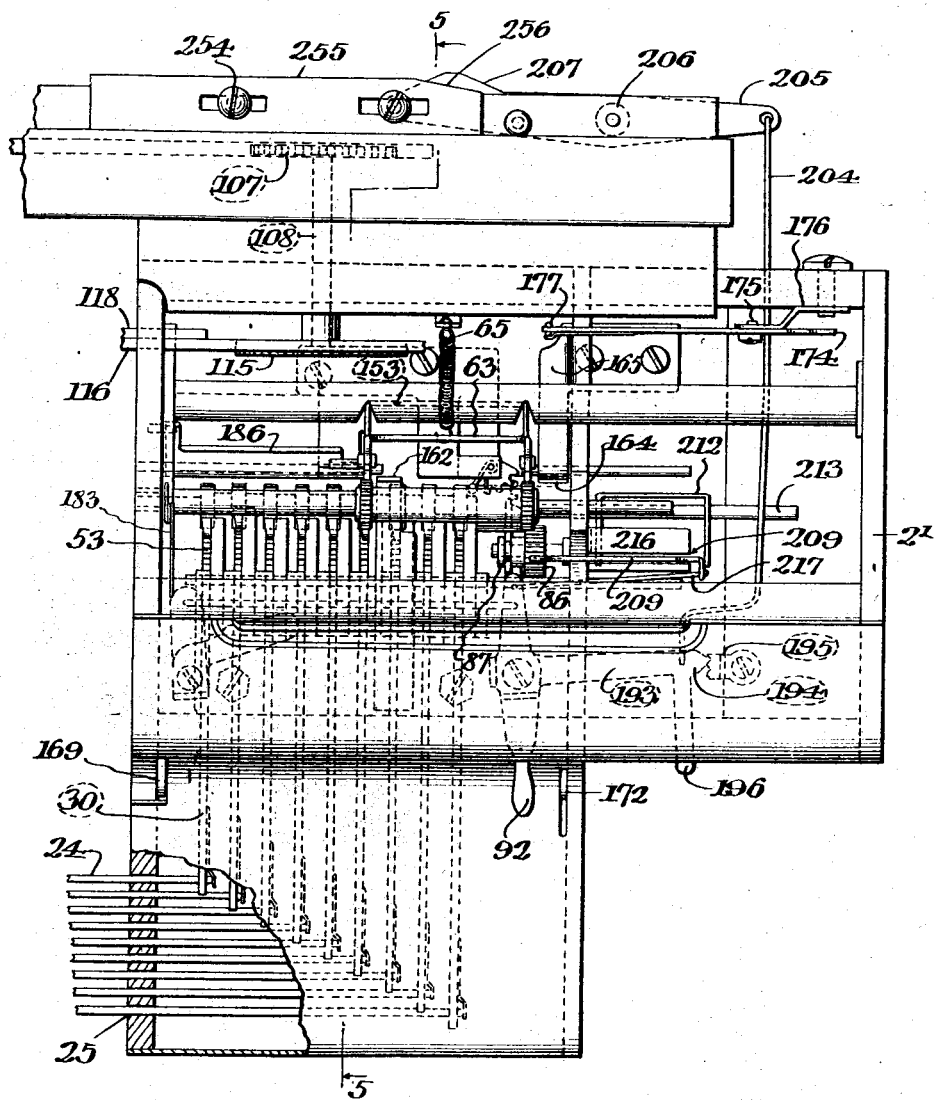
Figure 3 is a top plan view of the computing mechanism with the register removed.
Figure 4:
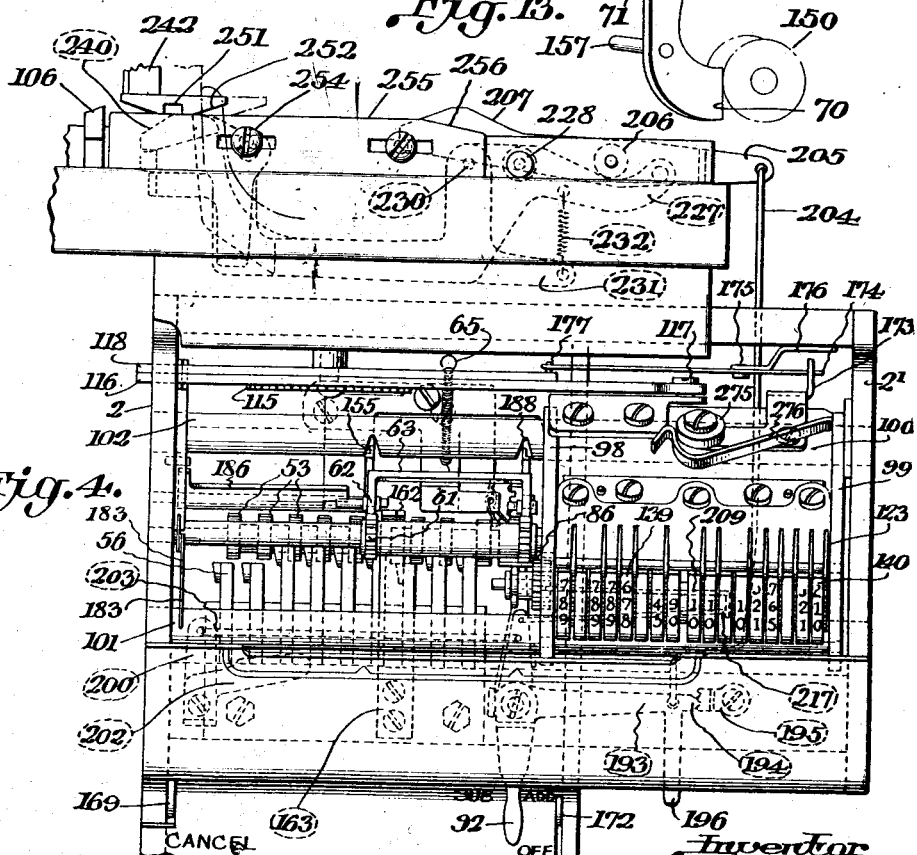
Figure 4 is a similar view with the register in place.

In order to properly position the index wheels 120 notwithstanding any play that may be allowed due to looseness of the lock gears there are provided two stationary positioning cams located just to the right of the two master wheels. One of these cams is shown at 162 (Figures 3 and 4) and is formed by the upturned edge of the plate 163 attached at its free end to the shelf of the frame member 3'. The other cam 164 (Figure 3) is the upturned end of a similar plate 165 which is supported in the rear of the casing. These cams align the index wheel just preceding its engagement with the master wheel so it will move freely into engagement with the latter.

It sometimes happens that the operator depresses the wrong numeral key and discovers this fact soon enough to avoid giving the key a sufficient blow to print from the actuated type bar. Due to the full stroke mechanism the type bar cannot move back to normal position without completing its movement. To avoid erroneous computation means is provided for permitting said type bar to be returned to normal position without printing and without actuating the computing mechanism. This means comprises a lever 166 (Fig. 11) pivoted at 167 and having its inner end drawn downwardly by a spring 168. When this lever is depressed by a finger piece 169 the inner end thereof engages the cam arm 151 on the end of the shaft 144 and moves the key lock rocker to the dotted line position of Fig. 11 wherein said rocker is entirely out of contact with the cam 48 on the cam gear and the cam gear is therefore allowed to return to normal position. Obviously the gears 45 and 46 are still in engagement and the reverse movement of the cam gear will return the indicating wheel to the position which it occupied prior to the partial depression of the key.

Sometimes it is desirable to depress a numeral key when in a computing zone without actuating the computing mechanism. This may occur when the figure has been printed too faintly and it is desired to make a heavier impression. This result may be attained by the following mechanism:—A lever 170 pivoted at 171 (Fig. 22) has an inner end underlying the roller 150 carried by the arm 149 which is attached to the shaft 144. The depression of the finger piece 172 will therefore lock the key lock rocker downward and move the fingers 145 and 147 out of position to be engaged by the cam 48 on the cam gear 42. The numeral key may then be operated to print and although motion will be given to the cam gears this is not transmitted to the computing mechanism due to the fact that the key lock rocker is in inoperative position.

The same action is automatically brought about when the register is moved to the extreme right hand position. A finger 173 carried by the register engages the cam end 174 (Figs. 3 and 22) of a lever pivoted at 175 to a bracket 176 extending from the rear portion of the frame. A link 177 connected to the free end of this lever is also connected to the free end of the lever 178 pivoted to the casing at 179. This lever has an upstanding ear 180 located directly below the roller 150 and adapted to engage the same whenever the lever 178 is operated and thereby move the key lock rocker to inoperative position. By means of this mechanism the computing devices are disconnected from the numeral keys of the typewriter whenever the computing register is in its right hand position.

The registers are provided with blank spaces for commas or periods and it is desired to render it impossible to depress a numeral key when the carriage is standing opposite one of these spaces. This result is obtained by means of a lever 181 (Figs. 5 and 7) pivoted at 182 to the inner side of the left frame of the casing and retained normally in position by a spring 183. This lever has a cut out to clear the rack 116 and a cam tooth 184 lying beneath the rack 118. The lever extends downwardly from this point and has a forward arm 185 in position to be engaged by a plate 186 having an eye at its lower edge mounted on the shaft 66. One of the master wheel pawls has a pin 187 which engages the plate when the frame 63 is rocked thus rocking lever 181 and moving cam tooth 184 into a space in the rack 118. As has been previously stated this rack 118 is provided with wide teeth 119 at intervals and these wide teeth are positioned so that they come opposite the cam tooth 184 when the carriage is standing in position for the writing of a comma or period between the denominations of the number being written. Since the cam tooth of the lever will come against the wide teeth of the rack 118 if a key is depressed at this time the lever 181 cannot move and consequently the whole train of mechanism is locked against movement and it is impossible to print from a numeral key at this point.

The rod 102 (Figs. 4, 6 and 10) has two notches 188 into which the lock gear levers move when they are moved by depression of the key. All other lock gear levers except those immediately in register with these notches are locked by the rod 102 against disengagement.

As previously stated there are three common errors that may arise in the operation of devices of this character. When the operator desires to transfer from the column totalizer to the grand totalizer and clear the former it is necessary to move the add and subtract lever to subtract position. This may be forgotten. If so the total already obtained would be double in the column register and the same amount would be subtracted from the grand totalizer. If there were no check upon the operation the operator might insert the next bill and continue writing without noticing the fact that both the column and grand totalizers are wrong. Means is therefore provided whereby when the register casing moves to the position to transfer the sum from the column totalizer to the grand totalizer and the operator has forgotten to move the lever to subtract it will be impossible to return the carriage to begin another line. The attention of the operator will then be called to the error which can readily be corrected as previously explained. The second source of error arises when a credit item has been entered in the column totalizer and it is desired next to write a debit item. The error check device which is embodied in this invention will prevent the return of the carriage to position for writing the next line unless the add and subtract lever has been moved back to add position. When both of these operations are performed the lever is or should be in subtract position and the error check embodied herein provides means for preventing the return of the carriage whenever the add and subtract lever is in subtract position and the column register has not been completely cleared. In the third place, it also provides means for preventing the return of the carriage when a number has been transferred from the column to the grand totalizer without previously moving the lever to subtract position. The mechanism by which these results are accomplished is as follows:—the lever 189 (Fig. 14) has an ear 190 connected thereto by a vertical portion 191 and both the lever and ear are pivoted on the same post 89' as the add and subtract lever 88 and lies between the same and the ear 91 of the latter. This lever 189 has a downturned ear 192 which will engage and move the add and subtract lever when moved in one direction. It also has a frame 193 provided with a detent pawl 194 which engages a spring detent 195 to hold it in either of two positions. This arm also has a finger piece 196 extending through an opening 197 in the front casing. A member 198 has two horizontal parts 199 and 200 pivoted on a screw post 201 carried by the shelf of the frame member 3'. The upper part 199 is provided with a cam arm 202 in position to be engaged by the register casing when it moves to the position where a number is to be transferred from the column totalizer to the grand totalizer. The other member 200 has connected thereto a link 203 the other end of which is connected to the lever 189 whereby this lever will be moved whenever the register is brought to said position and the cam arm 202 is moved thereby.

However, if the column register has not been properly cleared or if the add and subtract lever was not moved to subtract position when it was desired to clear the column register it will be found impossible to return the carriage to normal position. This is due to certain error check mechanism which will now be described.

Figure 23:
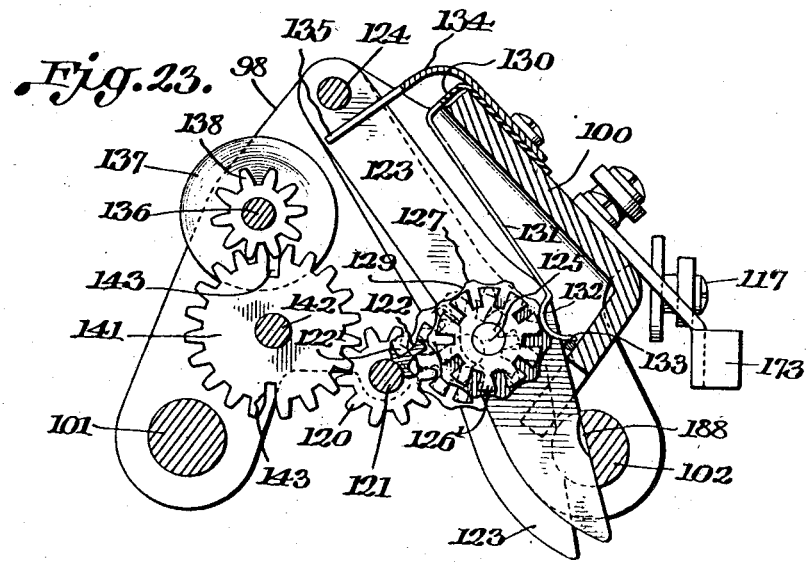
Figure 23 is an elevation with parts in section of the train of gearing in the register.
Figure 24:
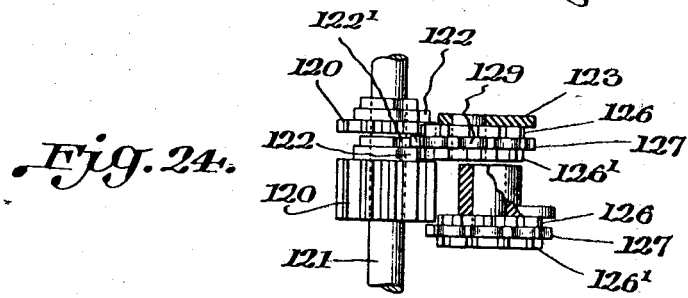
Figure 24 is a top plan with parts in section showing relation of the lock gears to the index wheels.

As previously stated the dial intermediate wheels 141 have two deep slots 143 (Fig. 23). When all wheels of the column totalizer are at zero these slots are aligned and the upper edge 209 (Fig. 19) of the feeler blade 210 may move into the same. This blade is mounted by ears 211 which are pivoted in a U-shaped frame 212 which in turn is pivoted on a shaft 213 (Fig. 3) which passes through openings 214 in the frame 212. The frame 212 together with the feeler blade may also have a slight endwise movement on the shaft 213. The blade may also have a vertical movement being guided in the slot in the frame and in a slot in a plate 216 (Fig. 3) carried by the frame. A link 217 (Fig. 14) connects an ear 218 on the feeler blade to the lever 189. Therefore the blade is given a slight endwise movement whenever the lever 189 is moved either automatically or by means of the add and subtract lever to subtract position. This movement is toward the left as shown in Figure 19.

The blade 210 has an opening 219 which is narrower at 220 on the right side thereof. Through this projects an end 221 of a bell crank lever 222 pivoted at 223 to an ear 224 of the frame and normally drawn by a spring 225 in one direction. An ear 226 engages the frame and limits its movement in this direction. When the parts are in the position of Figures 14 and 19 with the end 221 of the lever in the narrow opening 222 with the subtract lever set to subtract position any movement of the lever 221 would tend to raise the feeler blade and if all of the dial intermediate wheels in the column totalizers are not at zero so that the edge 209 can enter the slots 143 the feeler blade cannot move and therefore the lever 222 cannot move. This prevents return of the carriage in the following manner:—

A lever 227 (Figures 19, 20 and 21) is pivoted on a stud 228 carried by the rear top plate 19. One end of this lever is connected by a link 229 to the vertical arm of the bell crank lever 222. Pivoted at 230 on the lever 227 is a lever 231 to one end of which is connected a spring 232 which is attached at its other end to the lever 227. The lever 231 has a cam surface 233 and a rearwardly extending free end 234. The lever 227 has an angular free end 235 and pivoted at 236 to the angle thereof is a lever 237 in the form of a bell crank. It has an upwardly turned ear 238 engaging the cam surface 233 of the lever 231 and acting as a stop to limit the movement of the lever 231 under the influence of the spring 232. The lever 237 also has a downwardly turned ear 239 which engages the extreme end of the lever 227 and limits the movement of the lever 237 in one direction about its pivot 236. The lever 237 also has two cam edges 240 and 241. When the parts are in the position as shown in Fig. 19 which is the normal position the levers 227, 231 and 237 tend to turn as a unit about the pivot 228 whenever the lug 208, see Figure 15, of the carriage comes against the cam 240 on the return movement of the carriage. If the end 221 of the lever lies within the large opening 219 of the feeler blade, turning movement will be permitted since the opening 219 is large enough to allow oscillation of the lever 222 without the end 221 thereof coming in contact with the blade. Therefore this lever 222 will rock idly as the three levers 227, 231 and 237 turn as a unit. But if the end 221 of the lever 222 is in the narrow opening 220 as shown in Figures 14 and 19, it cannot move upwardly without moving the feeler blade 210 and if the dial intermediate wheels are not all in zero position the feeler blade and lever 222 cannot move. This being the case the lever 227 cannot move about its pivot 228. When the lug 208 (Fig. 28) contacts with the cam 240 on the lever 237 since the three levers cannot be moved as a unit lever 237 will be rocked about its pivot 236 from the dotted line position of Figure 20 to the full line position. The ear 238 moving along the cam 233 will move the lever 231 on its pivot against the tension of the spring 232 thereby moving the end 234 of the lever 231 to the full line position of Figure 20 in which position it will be engaged by the lug 208 and stop the carriage. Before the carriage can be returned the register must be clear or the finger piece 196 must be actuated to move the feeler blade toward the right of Figure 14 thus bringing the large opening 219 to a position to permit free movement of the lever 222.

The link 204 connects the arm 193 with one end of a lever 205 pivoted on a stud 206 carried by the underside of the top plate 19. This lever has a cam end 207 engaged by the depending lug 208 on the carriage of the typewriting machine. Whenever the add and subtract lever 88, 92 (Fig. 14) has been moved to subtract position the lever 189 has been moved in unison therewith. If the column register is now cleared and it is desired to return the carriage of the typewriting machine to position for beginning a new line the lug 208 on the carriage will come in contact with the cam end 207 of the lever 205 rocking the same on its pivot point and exerting a rearward pull on the link 204. This will move the arm 193 and the lever 189 and by means of the downturned ear 192 will move the add and subtract lever 28 back to add position. This automatic return of the add and subtract lever to add position will occur whenever the carriage is returned at a time when the lever stands in subtract position and the return movement of the carriage is possible.

It obviates the necessity of the operator's remembering to move the lever to add at the beginning of each new bill.

Fastened to the right hand side of the carriage frame B is a block 242 (Figs. 28 and 29) in which slides a pick up dog 243 urged by means of a spring 244 toward the position in which it will engage the detent 106. Pivoted at 245 on the side of the block 242 is a finger piece 246 in the rear edge of which there are two dwell portions 247 separated by an arc 248 drawn from a center eccentric to 245. The ear 249 contacts with the under edge of the lug 244 to limit the movement of the finger piece 246 in one direction. The pick up dog 243 has a depression 251, intermediate cams 252 and 253. When the parts are in the position shown in Figures 28 and 29 the pick up dog 243 is projected by the spring 244 into a position wherein the detent 106 will come in contact with one of the cam surfaces 252 or 253 depending upon the direction of movement of the carriage and after the detent 106 moves over the cam surface it will snap into the depression 251. This connects the computing mechanism to the carriage of the typewriting machine and causes the two to move in unison for a limited space. Whenever it is desired to throw the computing mechanism out of operation entirely the finger piece 246 is depressed until the dwell portion 247 contacts with the rear end 250 of the pick up dog. This carries the dog rearwardly to a position in which it will no longer engage the detent 106.

To the top plate 19 is attached by adjustable screws 254 a plate 255 having at one end thereof a cam 256 to cooperate with the cam 252 on the pick up dog. The other end 257 of the plate 255 may act as a stop to limit the movement of the detent 106 in one direction while a member 258 on the top plate 19 acts as a stop to limit its movement in the other direction.

Since the register is returned to home position by the carriage which is disconnected therefrom immediately thereafter there might be a rebound of the register. This is prevented in the following manner:—Fastened by set screws 259 to the outer end of the shaft 108 is a disk member 261 (Figures 15, 16 and 18). This member has a curved surface 262 and a radial face 263. The bracket 264 carried by the back of the casing has pivoted thereto at 265 a lever 266 which has a nose 267 adapted to ride over the curved surface 262 and be moved into engagement with the radial face 263. This lever is normally held away from the member by a spring 268. The bracket 264 has an ear 269 to limit the upward movement of the lever and the lever 266 has an ear 270 to engage the bracket and limit downward movement of the lever. Pivoted on the same pivot 265 is a bell crank lever 271 having an inner end provided with a cam face 272 adapted to be engaged by the lug 208 of the carriage. An ear 273 on the downwardly extending arm of the lever engages the lever 266 and tends to prevent relative movement between the two. The spring 279 draws this arm toward the right (Fig. 15).

When the carriage is connected with the computing mechanism and is moved to return the register to home position the cam surface 262 will ride over the nose 267 of the lever 266 and just at the moment when this cam surface rides off the nose the lug 208 on the carriage engages the cam ends 272 of the lever 271 and since the lever 266 is free to move both the levers 266 and 271 move as a unit causing the nose 267 to engage the radial face 263 of the member 261. This engagement occurs at the moment when the register reaches home position and will prevent any rebound thereof. The engagement is only temporary and the nose 267 of the pawl will disengage the member and permit further movement of the carriage. If after the carriage has been disconnected from the computing mechanism and the register thereof is standing in an intermediate position it may happen that the lug 208 will contact the curved face 272 of the lever 271 at a moment when the nose 267 is in engagement with the surface 262 and as shown in Figure 15. The lever 266 obviously cannot then move about its pivot 265, but the lever 271 will move relatively to the lever 266 tensioning the spring 264. In this manner the register may be picked up at any intermediate point and returned to its home position.

A roller 275 carried by the register is adapted to be engaged by cam spring finger 276 attached at 277 to the inside of the end 2' of the frame and acts to hold the register against accidental displacement. It is to be noted that the register is moved in both directions positively by the carriage and that no spring is used in returning the same. Accordingly there is no extra resistance to the movement of the carriage because of its connection to the resister of the computing device.

Figures 30 and 31 disclose an alternative method of connecting the numeral keys of the typewriter to the sectors 30. In this form a series of shafts 278 lie in a parallel plane underneath the keyboard and extend transversely thereof. Each shaft has at one end an arm 279 connected by a link 280 to one of the numeral keys G'. The other end of the rock shaft 278 has an arm 281 connected by a link 282 to a short arm 283 extending from the sector 30. In this form of construction the arms 283 on the sectors may be constructed all of the same length and variable movement is given to the sectors because of the varying lengths of the arms 279 and 281.

The position between the columns on the paper is one inch although the particular place on the paper on which these columns may be written can be varied considerably by adjustment of the paper sidewise on the platen. The angular adjustment of the gear 107 permits the proper relation between the carriage and register when the parts are assembled. Although the carriage spaces the register step-by-step this spacing need be only exact enough to permit the bevelled nose aligning pawl or tooth 184 to meet the walls in the notches in the rack 118.

Figure 1:
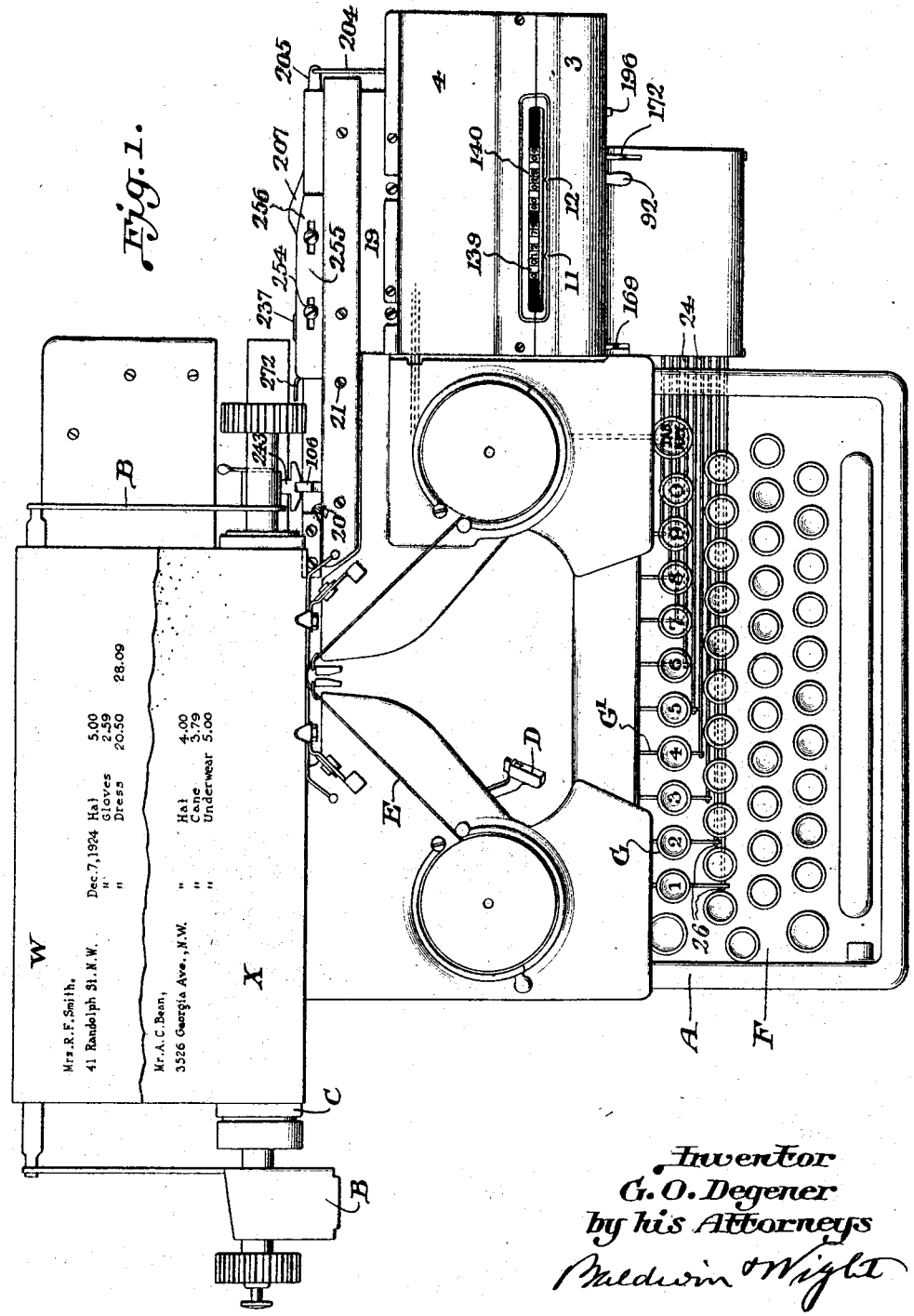
Figure 1 is a top plan view of the attachment in position on a typewriting machine conventionally illustrated, and also showing a sample of the character of work that the invention is particularly intended to perform.

The illustration of Fig. 1 shows fragments of two bills W and X which have been written, the first of which has been completed by the writing of the total while the total of the second has not been transferred from the column totalizer to the grand totalizer. When the bill W is placed in the machine the address and date are first written in the usual manner after which each item of the bill is written successively one under the other. As these items are written the sum thereof appears in the column totalizer. When the last item has been written the column totalizer will show a total of $28.09. The carriage is then tabulated or otherwise moved to the position in which the column totalizer registers with the index 11 and the grand totalizer with the index 12. The lever 92 is then moved to subtract position and the operator copies the number appearing in the column totalizer. This operation clears the column totalizer and since any operation performed in the column totalizer is performed in a reverse sense in the grand totalizer it will be added therein and the grand totalizer register will then show $28.09. If the operator has failed to copy the number correctly as for example by omission of the cents the column totalizer will not be properly cleared. Upon an attempt to return the carriage to position for writing the next bill it will be found that the carriage cannot be returned. This is due to the fact that since all of the dial intermediate wheels are not in zero position the feeler blade 209 cannot enter the slots 143 in said wheels and therefore through the mechanism particularly illustrated in Figs. 19, 20 and 21, the carriage is locked against return movement. This locking notifies the operator that an error has been made. To correct the same it is only necessary to move the carriage toward the left to bring the totalizers to the proper position and copy whatever remains in the column totalizer. This will clear the column totalizer allowing all dial intermediate wheels to return to zero and thereby permit the return of the carriage to position for writing a new bill. When the second bill X is placed in the machine the same procedure is followed. When the various items have been written the sum thereof $12.79 will appear in the column totalizer while the grand totalizer still shows the $28.09 of the preceding bill. The illustration of Fig. 1 shows the parts in the position ready for the clearing of the column totalizer and the carrying forward of the $12.79 into the grand totalizer. If this is correctly written the column totalizer will again be cleared while the grand totalizer will show a sum of $40.88.

If upon writing the total of any bill when it is desired to transfer the same from the column totalizer to the grand totalizer the operator should forget to move the lever 92 to subtract position obviously the number appearing in the column totalizer will be just doubled while that appearing in the grand totalizer will be diminished by the amount thus written. For example if the total of $12.79 of the bill X is written without the lever 92 being shifted to subtract position the column totalizer will show $25.58 while the grand totalizer will show only $15.30. If the carriage were thus free to move to position for writing a third bill obviously the grand total would be wrong and the total appearing for the third bill would also be wrong. However when the carriage moves to the position shown in Fig. 1 bringing the two registers to the positions opposite the indices 11 and 12 as shown the register carriage has through the lever 202 operated the feeler blade 209 bringing it to a point where the parts lie in the position shown in Fig. 14. Accordingly after the erroneous operation above described the dial intermediate wheels will not be at zero and the carriage cannot be returned to a position for writing the third bill. The operator's attention is then called to the fact that an error has been made. This error can be readily corrected by moving the carriage and register to the Fig. 1 position setting the lever to subtract and writing $12.79 two successive times in the same position in which it has been previously printed. The printing of course falls at the same point and only renders the type-written amount somewhat heavier in appearance. The result of the operation will be to subtract $25.58 from the column totalizer, thus clearing the same and to add $25.58 to the $15.30 appearing in the grand totalizer, thus making the amount total $40.88 which represents the proper amount.

A third source of error occurs when writing a credit item in the column totalizer column. To write said credit item the lever 92 must be moved to subtract position. Nevertheless in the absence of any check the operator might return the carriage and write the next debit item without returning the lever 92 to add position. However the movement of the lever to subtract position has moved the lever 189 which in turn moves the feeler blade to the Figure 14 position and since obviously the credit item entered has not cleared the column register it will be impossible to return the carriage to position for writing the next line without moving the lever 92 back to add position. Also under these circumstances it will be necessary to operate the finger piece 196 since the moving of the lever 92 from subtract to add position does not move the lever 189 nor the feeler blade therewith.

Whenever the column register has been cleared by a transfer of the same to the grand totalizer register a movement of the carriage to position for writing a new bill will automatically return the lever 92 to the add position by means of the cam 207 on the lever 205 which comes in engagement with the carriage thereby operating said lever and through the link 204 moving the lever 189 toward the right in Fig. 14. This movement also moves the add and subtract lever 88 to the add position.

It is to be noted that the error check mechanism which is brought into play whenever it is desired to transfer a number from the column totalizer to the grand totalizer is only operative when the register is moved to the grand totalizer position. It does not come into operation in the ordinary addition of the separate items in the column totalizer.

At the end of certain predetermined intervals it will be desired to clear the grand totalizer as well as the column totalizer. This is performed by moving the registers to the position shown in Fig. 1 in which the grand totalizer registers with the index 12. The lever 92 is then moved to add position which it is to be remembered performs the operation of subtraction in the grand totalizer and the number appearing in the grand totalizer is copied. This will clear the grand totalizer and add the same number to the column totalizer. The registers are then moved to the position in which the column totalizer registers with the index 12, the lever 92 is moved to subtract position and the number appearing in the column totalizer is copied. This clears the column totalizer and has no effect upon the grand totalizer at this time. Both registers are then clear.

It is obvious that the invention provides a simple and compact mechanism which is in the true sense of the word an attachment for a typewriting machine and which will perform the type of billing operations described above accurately and efficiently. The various error checks render the mechanism substantially fool proof and the machine may be operated by any one inexperienced in the operation of calculating machines with only a few instructions. While the invention has been illustrated and described in its preferred embodiment nevertheless it is obvious that many details may be changed and that parts of the device may be used without other parts without in any way departing from the spirit of the invention which is to be regarded as limited only by the scope of the appended claims.

I claim as my invention:

1. In a combined typewriting and computing machine, the combination of a travelling carriage, a computing attachment comprising a travelling register, a detent geared to said register, and a slidable pick up dog on the carriage for engaging said detent at a certain predetermined point and thereby connecting the carriage and the register.

2. In a combined typewriting and computing machine, the combination of a travelling carriage, a computing attachment comprising a travelling register, a detent geared to said register, a slidable pick up dog on the carriage normally urged to position to engage said detent at a certain predetermined position of the carriage, and means for moving said dog to a position in which it is free of said detent at all positions of the carriage.

3. In a combined typewriting and computing machine, the combination of a travelling carriage, a computing attachment comprising a travelling register, a slidable detent connected to move with said register, a slidable pick up dog on the carriage normally urged into position to engage said detent at a certain predetermined point in the travel of the carriage, and a manually actuated cam for moving said dog to inoperative position.

4. In a combined typewriting and computing machine, the combination of a travelling carriage, a computing attachment comprising a travelling register, a slidable detent geared to said register, and a spring actuated pick up dog on the carriage to automatically engage said detent at a certain predetermined position, said dog having a central notch and cam surfaces on each side thereof whereby it automatically engages said detent when moving in either direction.

5. In a combined typewriting and computing machine, the combination of numeral keys, a travelling register, means for operating said register from said numeral keys comprising a series of cam gears, cam members thereon, and means associated with said cam members for preventing return of the actuated numeral key until it has been fully depressed only when the register is in a computing zone.

6. In a combined typewriting and computing machine, the combination of numeral keys, a travelling register, means for operating said register from said numeral keys comprising a series of cam gears, cam members thereon, and means associated with said cam members for preventing a second actuation of any numeral key until it has fully returned to normal position only when the register is in a computing zone.

7. In a combined typewriting and computing machine, the combination of numeral keys, a travelling register, means for operating said register from said numeral keys comprising a series of cam gears, cam members thereon, and means associated with said cam members for preventing reversal of movement of any numeral key until it has been moved to one limit of its movement only when the register is in a computing zone.

8. In a combined typewriting and computing machine, the combination of numeral keys, a travelling register, a train of connections from each key to the register including a gear, a cam carried thereby, and means moved by said cam and preventing return of the same to normal position until it has been moved to its full limit of movement, said means and cam being brought into operative relation by the movement of the register to a computing zone.

9. In a combined typewriting and computing machine, the combination of numeral keys, a travelling register, a train of connections from each key to the register including a gear, a cam carried thereby, and unitary means rocked by said cam and preventing a reversal of movement of the gear until it has been moved to the limit of its movement in the direction in which it is moving, said means and cam being brought into operative relation by the movement of the register to a computing zone.

10. In a combined typewriting and computing machine, the combination of numeral keys, a travelling register, a train of connections from each numeral key to the register comprising a gear, a cam carried thereby and having grooves in its edge, and a member rocked by said cam and cooperating with said grooves to compel a full operation of said gear before the direction of movement can be reversed, said member being moved out of operative relation with the cam when the register is moved out of a computing zone.

11. In a combined typewriting and computing machine, the combination with numeral keys, a travelling register, a train of connections from each numeral key to the register comprising a gear, a cam carried thereby and having grooves in its edge, and a rocking member having a tooth cooperating with said grooves to compel a full depression of the numeral key before return to normal is permitted, said member being moved out of operative relation with the cam when the register is moved out of a computing zone.

12. In a computing machine, the combination of a travelling register, a train of gearing for operating the same, a cam rigidly carried by one gear of said train, and means cooperating with said cam only when the register is in a computing zone to form full stroke devices.

13. In a computing machine, the combination of a travelling register, a train of gearing for operating the same, a cam rigidly carried by one gear of said train and having grooves in its edge, and a rocking member cooperating with said grooves only when the register is in a computing zone to form full stroke mechanism.

14. In a computing machine, the combination of a travelling register, a train of gearing for operating the same, a cam associated with one gear of said train and having grooves in its edge, and a single member rocked by said cam and cooperating with said grooves only when the register is in a computing zone to prevent reversal of direction of movement of the gear until the movement started has been completed.

15. In a computing machine, the combination of a travelling register, a train of gearing for operating the same, and full stroke mechanism comprising a means rigid with a member of said train of gearing and a cooperating device which is in effective relation to said means only when the register is in a computing zone.

16. In a computing machine, the combination of a register, a train of gearing for operating the same, and full stroke mechanism associated with a member of said train of gearing, said full stroke mechanism being effective only when the register is in a computing zone.

17. In a computing machine, the combination of a register, a train of gearing for operating the same, full stroke mechanism associated with a member of said train of gearing, said full stroke mechanism being effective only when the register is in a computing zone, and means for rendering said full stroke mechanism ineffective when the register is in the computing zone.

18. In a computing machine, the combination of a register, a train of gearing for operating the same, a key for operating the train of gearing, full stroke mechanism associated with a member of said train of gearing, and means for releasing the full stroke mechanism upon an incomplete actuation of said key thereby permitting the key to return to normal position without operating the register.

19. In a computing machine, the combination of a register, a train of gearing for operating the same, a key for operating the train of gearing, full stroke mechanism associated with a member of said train of gearing, said full stroke mechanism being effective only when the register is in a computing zone, and means for releasing the full stroke mechanism upon an incomplete actuation of said key thereby permitting the key and register to return to normal position.

20. In a computing machine, the combination of a register, a train of gearing for operating the same, a key for operating the train of gearing, full stroke mechanism associated with a member of said train of gearing, said full stroke mechanism being effective only when the register is in a computing zone, means for releasing the full stroke mechanism upon an incomplete actuation of said key, thereby permitting the key to return to normal position without completely operating the register, and means for rendering the full stroke mechanism ineffective when the register is in the computing zone.

21. In a computing machine, the combination of a register, a train of gearing for operating the same, a key for operating the train of gearing, full stroke mechanism associated with a member of said train of gearing, and two keys for disabling the full stroke mechanism.

22. In a computing machine, the combination of a register, a train of gearing for operating the same, a key for operating the train of gearing, full stroke mechanism associated with a member of said train of gearing, and two keys for disabling said full stroke mechanism, one of the keys being operative after a partial depression of said train of gearing, and the other effective when the parts are in normal position.

23. In a computing machine, the combination of a register, a normally ineffective train of gearing for operating the register, and means for rendering said train of gearing effective, said means including a member which forms part of a full stroke mechanism.

24. In a computing machine, the combination of a register, a normally incomplete train of gearing for operating the register, and means for completing said train of gearing, said means including a member which forms part of a full stroke mechanism.

25. In a computing machine, the combination of a register, a normally incomplete train of gearing for operating the register, a slidable gear for completing said train, and a rocking member for sliding said gear, said rocking member forming part of a full stroke mechanism.

26. In a computing machine, the combination of a register, a normally incomplete train of gearing for actuating the same, a cam carried by one member of said train, a slidable gear for completing said train, and a member for sliding said gear, said member cooperating with said cam to form full stroke mechanism.

27. In a computing machine, the combination of a register, a normally incomplete train of gearing for actuating the same, a cam carried by one member of said train and having notches in its edge, means for completing said train of gearing, and an operating member for said means, said member cooperating with the notches in the cam to form full stroke mechanism.

28. In a computing machine, the combination of a register, a normally incomplete train of gearing for actuating the same, a cam carried by one member of said train and having notches in its edge, means for completing said train of gearing, and a rocking member for operating said means, said member having a tooth to cooperate with the notches in the cam to form full stroke mechanism.

29. In a computing machine, the combination of a register, a key, a normally ineffective train of gearing for operating the register from said key, means operated by the initial depression of the key to render the train effective, and means whereby said train of gearing becomes ineffective at the end of the down stroke of the key.

30. In a computing machine, the combination of a register, a key, a normally ineffective train of gearing for operating the register from the key including a gear constantly operative by said key, a cam carried by said gear, means operated by said cam during the initial movement of said gear to render said train effective, and means whereby said train of gearing becomes ineffective at the end of a definite movement of said cam.

31. In a computing machine, the combination of a register, a key, a normally ineffective train of gearing for operating the register from the key including a gear constantly operative by said key, a cam carried by said gear, means operated by said cam during a definite portion of the movement of the gear, said means rendering the gear train effective when engaged by said cam and returning it to ineffective condition when disengaged from the cam.

32. In a computing machine, a register, a key, a normally ineffective train of gearing for operating the register from the key including a gear constantly operative by said gear, a rocking member engaged by the cam at the initial depression of the key, means controlled by said rocking member for rendering the gear train effective, said rocking member returning to normal position when disengaged from said cam and returning the gear train to ineffective condition.

33. In a computing machine, the combination of a register, a key, a normally incomplete train of gearing for operating the register from the key, a gear in said train constantly operative by the key and having a cam, a slidable gear for completing said train, means operated by said cam for sliding said gear, and a spring for returning said means to normal position and sliding said gear to ineffective position when the cam disengages said means.

34. In a computing machine, the combination of a register, a key, a normally incomplete train of gearing for operating the register from the key, a gear in said train constantly operative by said key and having a cam, a slidable gear for completing said train, a rocking member operated by said cam, means controlled by said rocking member for moving the slidable gear to complete the train, and spring means for returning said rocking member to normal position when disengaged from said cam.

35. In a computing machine, the combination of a register, a key, a normally ineffective train of gearing for operating said register from said key, a device operated upon the initial depression of the key for rendering said train effective, and means operable after an incomplete depression of the key for permitting the train to return to inoperative position without completely operating said register.

36. In a computing machine, the combination of a register, a key, a normally ineffective train of gearing for operating the register from the key, a device operated upon the initial depression of the key for rendering said train effective, and means for moving said device to inoperative position to permit a key depression without completely operating said register.

37. In a computing machine, the combination of a register, a key, a normally ineffective train of gearing for operating the register from the key, a device operated upon the initial depression of the key for rendering said train effective, means for moving said device to inoperative position to permit a key depression without operating said device, and manually operable means effective after an incomplete depression of said key for permitting the train to return to inoperative position without completely operating said register.

38. In a computing machine, the combination of a register, a key, a normally ineffective train of gearing for operating the register from said key, and a device operated upon the initial depression of the key for rendering said train effective, said device operative only when the register is in a computing zone.

39. In a computing machine, the combination of a register, a key, a normally ineffective train of gearing for operating the register from said key, a device operated upon the initial depression of the key for rendering said train effective, said device operative only when the register is in a computing zone, and two separate means for moving said device to inoperative position.

40. In a computing machine, the combination of a register, a key, a normally ineffective train of gearing for operating the register from said key, a device operated upon the initial depression of the key for rendering said train effective, said device operative only when the register is in a computing zone, and two manually operable keys for moving said device to inoperative position.

41. In a computing machine, the combination of a register, a key, a train of connections between the key and the register comprising a gear, a unit pinion normally out of register with said gear, and a member operable by the initial movement of the gear to move the pinion into register with the gear.

42. In a computing machine, the combination of a register, a key, a train of connections between the key and the register, comprising a gear, a cam carried thereby, a unit pinion normally out of register with said gear, and means operated by said cam to move the pinion into register with the gear.

43. In a computing machine, the combination of a register, a key, a train of connections between the key and the register comprising a gear, a cam carried thereby, a unit pinion normally out of register with said gear, and a rocking member actuated by said cam and moving said pinion into register with the gear.

44. In a computing machine, the combination of a register, a key, a train of connections between the key and the register comprising a gear, a cam carried thereby, a unit pinion normally out of register with said gear, a rocking member actuated by said cam, and a frame actuated by said member to move said pinion to register with said gear.

45. In a computing machine, the combination of a register, a key, a train of connections between the key and the register comprising a gear, a cam carried thereby, a unit pinion normally out of register with the gear, means operated thereby for moving the pinion into register with the gear, and means whereby at a full depression of the key, said means returns to inoperative position and the unit pinion moves out of register with the gear.

46. In a computing machine, the combination of a register, a key, a train of connections between the key and the register comprising a gear, a unit pinion normally out of register with said gear, a unit pinion pawl, and means operated by the initial movement of the gear to cause the pawl to engage the pinion to properly position the same.

47. In a computing machine, the combination of a register, a key, a train of connections between the key and the register comprising a gear, a unit pinion normally out of register with said gear, a unit pinion pawl, means operated by the initial movement of the gear to cause the pawl to engage the pinion to properly position the same, and means operated immediately following by the gear to move the pinion into register with the gear.

48. In a computing machine, the combination of a register, a key, a train of connections between the key and the register comprising a gear, a unit pinion normally out of register with said gear, a unit pinion pawl, a cam on said gear to move the pawl into engagement with the pinion on the first movement of the gear, and a second cam on the gear to move the pinion into register with the gear upon the immediate subsequent movement of the gear.

49. In a computing machine, the combination of a register, a key, a train of connections between the key and the register comprising a gear, a unit pinion normally out of register with said gear, and means operated by the rotation of the gear for positioning said pawl and moving it into register with the gear, said means permitting the return of the parts to normal position when the gear has completed its forward movement of rotation.

50. In a computing machine, the combination of a register, a key, a train of connections between the key and the register comprising a gear, a unit pinion normally out of register therewith, a master wheel, a pawl therefor, and means operated by the rotation of the gear for moving the pinion into register with the gear and moving the pawl out of engagement with the master wheel.

51. In a computing machine, the combination of a register, a key, a train of connections between the key and the register comprising a gear, a unit pinion normally out of register therewith, a master wheel, a pawl normally in engagement therewith, a rocking frame actuated by the movement of said gear to first move the pinion into register with said gear and then move the pawl out of engagement with the master wheel.

52. In a computing machine, the combination of a register, a key, a train of connections between the key and the register comprising a gear, a unit pinion normally out of register therewith, a master wheel, a pawl normally in engagement therewith, an index wheel, a lock gear normally in engagement with said index wheel, and a member actuated by said gear to move the unit pinion into register with said gear, move the pawl out of engagement with the master wheel, and move the lock gear out of engagement with the index wheel.

53. In a computing machine, the combination of a register, a key, a train of connections between the key and the register comprising a gear, a unit pinion normally out of register therewith, a master wheel, a pawl normally in engagement therewith, an index wheel, a lock gear normally in engagement with said index wheel, and a rocking member actuated by said gear to slide the unit pinion into register with said gear, move the pawl out of engagement with the master wheel, and thereby move the lock gear out of engagement with the index wheel, all of said parts returning to normal position upon the completion of a certain extent of movement of the first mentioned gear.

54. In a computing machine, the combination of a register, a key, a train of connections between the register and the key comprising a lock gear, a lock gear lever for supporting the same, an index wheel with which the lock gear meshes, a rocking frame for moving the lock gear lever to unmesh the lock gear and the index wheel at the depression of a key, and means comprising a frame for returning said parts into engagement.

55. In a computing machine, the combination of a register, a key, a train of connections between the register and the key comprising a lock gear, a lock gear lever upon which the lock gear is pivotally mounted, an index wheel with which the lock gear normally meshes, a rocking frame for moving the lock gear lever to unmesh the lock gear and the index wheel upon the depression of a key, and a second frame actuated from the first for returning said lock gear and index wheel into engagement.

56. In a computing machine, the combination of a travelling register, a rack, said register and rack moving in parallel paths, a movable pawl for engaging said rack to position said register, means for moving said pawl into engagement with the rack when the computing mechanism is operated, and means on said rack preventing such engagement at certain predetermined points and thereby preventing operation of the computing mechanism.

57. In a combined typewriting and computing machine, the combination of a travelling carriage, a register travelling therewith through the computing zone, a key, a rack, said register and rack moving in parallel paths, a pawl for engaging said rack to position the register upon the depression of the key, and means for preventing this engagement at certain points and thereby preventing depression of the key.

58. In a combined typewriting and computing machine, the combination of a travelling carriage, a computing register comprising a series of wheels provided with slots which are in line when the register is at zero, and means moved into said slots by the return movement of the carriage after subtraction has cleared the register, and preventing complete return movement of the carriage unless the register has been cleared.

59. In a combined typewriting and computing machine, the combination of a travelling carriage, a computing register comprising a series of wheels provided with slots, a feeler blade to enter said slots when they are aligned, and carriage controlled means for operating said feeler blade, and preventing complete return movement of the carriage unless the register has been cleared.

60. In a combined typewriting and computing machine, the combination of a travelling carriage, a computing register comprising a column totalizer having a series of wheels provided with slots that are in line when the wheels all register zero, a feeler blade mounted to move into said slots, and means for preventing return of the carriage after an operation of subtraction only if the column totalizer is not cleared.

61. In a combined typewriting and computing machine, the combination of a travelling carriage, a column totalizer, an add and subtract lever, and means for preventing return of the carriage when the lever is set to subtract and the column totalizer is not cleared.

62. In a combined typewriting and computing machine, the combination of a travelling carriage, a column totalizer, an add and subtract lever, and means set by the movement of the lever to subtract which prevent return of the carriage thereafter unless the column totalizer is cleared.

63. In a combined typewriting and computing machine, the combination of a travelling carriage, a column totalizer, an add and subtract lever, a rocking lever operated by the return of the carriage, and means set by the movement of the add and subtract lever to subtract which prevents the rocking of said lever unless the column totalizer has been cleared.

64. In a combined typewriting and computing machine, the combination of a travelling carriage, a register comprising a column totalizer and a grand totalizer, means for transferring amounts from the column to the grand totalizer, and means for preventing return of the carriage unless the amounts have been correctly transferred.

65. In a combined typewriting and computing machine, the combination of a travelling carriage, a register comprising a column totalizer and a grand totalizer, and add and subtract lever, means for transferring amounts from the column to the grand totalizer, and means for preventing return of the carriage unless the lever has been set to subtract prior to said transfer operation.

66. In a combined typewriting and computing machine, the combination of a travelling carriage, a register comprising a column totalizer and a grand totalizer, an add and subtract lever providing for the entry of credit items in the column totalizer, and means for preventing the return of the carriage if the lever is not returned to add after the entry of a credit item.

67. In a combined typewriting and computing machine, the combination of a travelling carriage, a register comprising a column totalizer and a grand totalizer, an add and subtract lever, and error check mechanism which prevents the return of the carriage when the lever is not moved to add after the entry of a credit item in the column totalizer, and also when the amount in the column totalizer has not been correctly transferred to the grand totalizer.

68. In a combined typewriting and computing machine, the combination of a travelling carriage, a column totalizer, an add and subtract lever permitting the entry of credit items in the column totalizer, and means positioned by said lever and preventing return of the carriage after the entry of a credit item unless the lever has been returned to add.

69. In a combined typewriting and computing machine, the combination of a column totalizer, a grand totalizer, an add and subtract lever permitting the transfer of amounts from the column to the grand totalizer, and means controlled by the position of the totalizers and preventing return of the carriage unless the lever has been set to subtract prior to said transfer.

70. In a combined typewriting and computing machine, the combination of a travelling carriage, a column totalizer, a grand totalizer, an add and a subtract lever permitting the transfer of amounts from the column to the grand totalizer, and an error check mechanism controlled by the position of the totalizers to prevent return of the carriage unless the lever has been moved to subtract prior to said transfer, said error check mechanism also preventing return of the carriage when the lever has been moved to subtract unless the column totalizer has been cleared.

71. In a combined typewriting and computing machine, the combination of a travelling carriage, a column totalizer travelling therewith through the computing zone, an add and subtract lever, and error check mechanism thrown in by the add and subtract lever and cooperative with the totalizer when it has reached home position to prevent return of the carriage unless the totalizer has been cleared.

72. In a combined typewriting and computing machine, the combination of a travelling carriage, a column totalizer travelling therewith through the computing zone, an add and subtract lever, and error check mechanism thrown in by the movement of the totalizer which prevents return movement of the carriage unless the lever has been moved to subtract.

73. In a combined typewriting and computing machine, the combination of a travelling carriage, a column totalizer, a grand totalizer, an add and subtract lever, and error check mechanism preventing return of the carriage under three conditions: when the lever has not been moved to subtract to transfer from column to grand totalizer, when lever has been moved to subtract and column totalizer has not been cleared, and when lever has been moved to subtract for entering a credit item in the column totalizer and has not been restored to add.

74. In a combined typewriting and computing machine, the combination of a travelling carriage, a column totalizer, a grand totalizer, and error check mechanism preventing return of the carriage unless the amount in the column totalizer has been properly transferred to the grand totalizer.

75. In a combined typewriting and computing machine, the combination of a travelling carriage, a column totalizer, a grand totalizer, an add and subtract lever, and error check mechanism operated either by the movement of the totalizers to position for transfer from the column totalizer to the grand totalizer or by the movement of the lever to subtract position which prevents return of the carriage unless the amount in the column totalizer has been properly transferred to the grand totalizer.

76. In a combined typewriting and computing machine, the combination of a travelling carriage, a column totalizer, and error check mechanism which becomes operative at the beginning of the clearing operation for preventing return of the carriage only after certain predetermined errors, said mechanism comprising gears in the totalizer having slots and a feeler blade adapted to cooperate with said slots.

77. In a combined typewriting and computing machine, the combination of a travelling carriage, a column totalizer, and error check mechanism for preventing return of the carriage after certain predetermined errors, said mechanism comprising gears in the totalizer having slots, a feeler blade adapted to cooperate with said slots, and means for projecting a stop into the path of the carriage when the feeler blade is prevented from entering said slots.

78. In a combined typewriting and computing machine, the combination of a travelling carriage, a column totalizer, and error check mechanism for preventing the return of the carriage, said mechanism comprising gears in said totalizer which are aligned when the totalizer is at zero, a feeler blade adapted to enter the aligned slots, and having endwise movement, and means whereby the feeler blade in one position will prevent return of the carriage if the slots are not aligned.

79. In a combined typewriting and computing machine, the combination of a travelling carriage, and error check mechanism, said mechanism comprising a series of gears provided with slots, a feeler blade adapted to enter said slots when aligned, a train of connections operated by the carriage to move said feeler blade, and means whereby an element of this train of connections will prevent the return of the carriage when the blade cannot enter the slots.

80. In a combined typewriting and computing machine, the combination of a travelling carriage, and error check mechanism, said mechanism comprising a series of gears provided with slots, a feeler blade adapted to enter said slots when aligned, said feeler blade movable to two positions endwise, a lever adapted to move the feeler blade when the latter is in one position only, and means whereby the inability of said lever at such time to move will prevent the return of the carriage.

81. In a combined typewriting and computing machine, the combination of a travelling carriage, and error check mechanism, said mechanism comprising a feeler blade movable endwise to two positions, a lever adapted to move said feeler blade in another direction when in one of said positions only, and a train of connections whereby the movement of the carriage will move said lever, said train of connections operating to stop the return of the carriage if the lever is not free to move.

82. In a combined typewriting and computing machine, the combination of a travelling carriage, and error check mechanism, said mechanism comprising a feeler blade blocked against movement under certain conditions, a train of connections for moving said feeler blade by the movement of the carriage, and means whereby this train of connections interposes a stop in the path of the return movement of the carriage if the feeler blade is blocked against movement.

83. In a computing machine, the combination of an error check mechanism, an add and substract lever, and means whereby the error check mechanism is rendered operative by movement of the lever to subtract.

84. In a computing machine, the combination of a travelling totalizer, error check mechanism preventing the complete return of the carriage, and means whereby the error check mechanism is rendered effective by movement of the totalizer to a certain position.

85. In a computing machine, the combination of a travelling totalizer, an add and subtract lever, error check mechanism, and means whereby the error check mechanism is rendered operative by the movement of the lever to subtract, or by the movement of the totalizer to a certain position.

86. In a combined typewriting and computing machine, the combination of a travelling carriage, an error check mechanism, an add and subtract lever, means whereby the error check mechanism is rendered operative by movement of the lever to subtract, and means for automatically returning the lever to add position by the return of the carriage.

87. In a combined typewriting and computing machine, the combination of a travelling carriage, a travelling totalizer, an add and subtract lever, error check mechanism, means whereby the error check mechanism is rendered operative by movement of the totalizer to a certain position, and means for returning the lever from subtract to add position by the return movement of the carriage.

88. In a combined typewriting and computing machine, the combination of a travelling carriage, an add and subtract lever, a feeler blade having a large and a small opening therein, a lever having an arm which moves idly in the large opening, means for moving the feeler blade to bring the lever arm into the small opening, said means operated by movement of the add and subtract lever to subtract position, and means actuated by the carriage in its return movement for operating said lever arm.

89. In a combined typewriting and computing machine, the combination of a travelling carriage and travelling totalizer, a feeler blade having a large and a small opening therein, a lever having an arm which moves idly in the large opening, means for moving the feeler blade to bring the lever arm into the small opening, said means operated by movement of the travelling totalizer to a predetermined position, and means actuated by the carriage in its return movement for operating said lever arm.

90. In a combined typewriting and computing machine, the combination with a travelling carriage, a travelling totalizer, an add and subtract lever, a feeler blade having a large and a small opening therein, a lever having an arm which moves idly in the large opening, means for moving the feeler blade to bring the lever arm into the small opening, said means operated by movement of the totalizer to a predetermined position or by movement of the add and subtract lever to subtract position, and means actuated by the carriage in its return movement for operating said lever arm.

91. In a computing mechanism, the combination of an add and subtract lever, and error check mechanism, said mechanism comprising an error lever having a one way connection with the add and subtract lever, and a feeler blade controlled by said error lever.

92. In a computing mechanism, the combination of a travelling carriage, an add and subtract lever, and error check mechanism, said mechanism comprising an error lever having a one way connection with the add and subtract mechanism, and a feeler blade controlled by said error lever, said feeler blade preventing the return of the carriage under predetermined conditions.

93. In a computing mechanism, the combination of a travelling carriage, an add and subtract lever, and error check mechanism, said mechanism comprising an error lever having a one way connection with the add and subtract lever, a lever moved by the carriage, and means whereby said feeler blade when operated causes said lever to interpose a stop in the path of the carriage to prevent its return movement.

94. In a combined typewriting and computing machine, the combination of a travelling register, positive means for returning the register to home position, and a spring detent retaining it against accidental displacement from said position.

95. In a combined typewriting and computing machine, the combination of a travelling register, a travelling carriage, means for moving the register to home position by the return movement of the carriage, and a spring detent retaining it against accidental displacement from said position.

96. In a combined typewriting and computing machine, the combination of a travelling register, a travelling carriage, means for moving the register to home position by the return movement of the carriage, means for automatically disconnecting the carriage from the register at that point, and a spring detent for retaining the register against accidental displacement from home position.

97. In a combined typewriting and computing machine, the combination of a travelling register, a travelling carriage, means for moving the register to home position by the return movement of the carriage, means for disconnecting the carriage from the register at that time, and means for preventing rebound of the register.

98. In a combined typewriting and computing machine, the combination of a travelling register, a travelling carriage, means for moving the register to home position from the carriage including a shaft, means for disconnecting the carriage from the register at that time, and means coacting with said shaft for preventing rebound of the register.

99. In a combined typewriting and computing machine, the combination of a travelling register, a travelling carriage, means for moving the register to home position from the carriage including a shaft constantly geared to said register, a disk on said shaft, means for disconnecting the carriage from the register when the latter reaches home position, and means coacting with said disk to prevent rebound of the register.

100. In a combined typewriting and computing machine, the combination of a travelling register, a travelling carriage, means for moving the register to home position from the carriage, and means for preventing rebound of the register comprising a rotating disk having a radial face, and a lever actuated by the carriage and having a tooth to engage said face when the register reaches home position.

101. In a combined typewriting and computing machine, the combination of a travelling register, a travelling carriage, means for moving the register to home position from the carriage, and means for preventing rebound of the register comprising a rotating disk having a radial face, a lever actuated by the carriage and having a tooth to momentarily engage said face when the register reaches home position, said tooth immediately moving out of engagement with said face.

102. In a combined typewriting and computing machine, the combination of a travelling register, a travelling carriage, means for connecting the register to the carriage and moving the former to home position, means for disconnecting the carriage from the register at this time, and means for preventing rebound of the carriage comprising a rotating disk having a radial face and a curved face and a lever actuated by the carriage and having a tooth which is brought momentarily into engagement with said radial face when the register reaches the home position, said lever yielding to permit movement thereof if engaged by the carriage when the tooth is opposite the curved face.

103. In a combined typewriting and computing machine, the combination of a travelling register, positive means for returning the register to home position, and means for preventing rebound thereof comprising a rotating disk having a radial face and a lever having a tooth brought momentarily into engagement with said face when the register reaches home position.

104. In a combined typewriting and computing machine, the combination of a travelling element, means for positively moving the same to the limit of its movement in one direction, and means for preventing rebound thereof comprising a rotating disk having a radial face, and means engaging said radial face when the element has reached the limit of its movement.

105. In a combined typewriting and computing machine, a travelling carriage and error check mechanism, said mechanism comprising a lever pivoted on a support, a second and a third lever each pivoted to the first, all three levers normally moving as a unit, and means whereby when resistance is offered to said unitary movement, the third lever moves the second on the first to interpose a stop in the path of the carriage.

106. In a computing machine, the combination of a frame, two rods supported therein, a register sliding on said rods, one of said rods having two notches therein, lock gear levers in said register, and means for moving a lock gear lever only when it is opposite one of said notches.

107. In a computing machine, the combination of a frame, two rods supported therein, a register travelling on said rods, one of said rods having two notches therein, lock gear levers in said register, means for moving a lock gear lever only when it is opposite one of said notches, and means for positively returning the operated lock gear lever.

108. In a computing machine, the combination of a frame, two rods supported therein, a register travelling on said rods, one of the rods having two notches therein, lock gear levers in said register, a master wheel, a master wheel pawl normally engaging the same, and means whereby the disengaging movement of the master wheel pawl will move only the lock gear lever opposite a notch.

109. In a computing machine, the combination of a frame, two rods supported therein, a register travelling on said rods, one of the rods having two notches therein, lock gear levers in said register, a master wheel, a master wheel pawl normally engaging the same, means whereby the disengaging movement of the master wheel will move only the lock gear lever opposite a slot, and means for positively returning the operated lock gear lever.

110. In a computing machine, the combination of a register comprising a sleeve carrying unit pinions, a master wheel, a pawl normally engaging the same, and means for sliding said sleeve endwise by movement of the master wheel pawl which comprises a rocking frame, a shaft having an offset arm to engage said sleeve, and operating connections between the frame and the shaft.

111. In a computing machine, the combination of a master wheel, a register comprising a series of index wheels which come into register with the master wheel, a series of lock gears normally meshing with the index wheels, a series of identical levers for carrying said gears, and means for moving the lock gear out of mesh with the index wheel which is at that time in mesh with the master wheel.

112. In a computing machine, the combination of a master wheel, a register comprising a series of index wheels which come into register with the master wheel, a series of lock gears normally meshing with the index wheels, means for moving the lock gear out of mesh with the index wheel which is at that time in mesh with the master wheel, and a fixed member for locking all other lock gears against disengagement at this time.

113. In a combined typewriting and computing machine, the combination of typewriter keys, a register, and a train of mechanism for operating the register from each of said keys comprising a sector, a gear adapted to mesh therewith and having timing cams thereon, a slidable sleeve carrying a gear adapted to mesh with said first named gear, and a full stroke device for the keys comprising a member which shifts said slidable gear.

114. In a combined typewriting and computing machine, the combination of typewriter keys, a register, and a train of mechanism for operating the register from each of the keys comprising a sector, a gear adapted to mesh therewith and having timing cams thereon, a slidable sleeve carrying a gear adapted to mesh with the first named gear, and a full stroke device for the keys comprising a member which is moved by one of said cams and shifts said slidable gear.

115. In a combined typewriting and computing machine, the combination of a carriage having a to and fro movement, a travelling totalizer, error check mechanism for preventing complete return movement of the carriage, and means whereby the error check mechanism is rendered operative by the movement of the totalizer to a certain position and becomes effective at the beginning of a clearing operation.

116. In a computing machine, the combination of a travelling totalizer, error check mechanism, and means whereby the error check mechanism is rendered operative by a movement of the totalizer to clearance position and becomes effective at the beginning of a clearing operation.

117. In a combined typewriting and computing machine, the combination of a carriage having a to and fro movement, a column totalizer, an add and subtract lever providing for the entry of credit items in the column totalizer, and means controlled by the movement of the totalizer into a computing zone for preventing return of the carriage thereafter.

118. In a combined typewriting and computing machine, the combination of a travelling carriage, a travelling totalizer, error check mechanism preventing return of the carriage unless the totalizer has been cleared, and means controlled by the position of the totalizer as soon as it enters a computing zone for rendering said error check mechanism operative.

119. In a computing machine, the combination of a travelling totalizer, means for subtracting from said totalizer, error check mechanism, and means controlled by the position of the totalizer as soon as it enters a computing zone for causing said error check mechanism to become operative after the operation of subtraction unless the totalizer has been cleared.

In testimony whereof, I have hereunto subscribed my name.

GUSTAVE O. DEGENER.